United States Patent
Yang et al.

(10) Patent No.: US 11,249,571 B2
(45) Date of Patent: Feb. 15, 2022

(54) INPUT SENSING PANEL AND DISPLAY DEVICE HAVING THE SAME

(71) Applicant: SAMSUNG DISPLAY CO., LTD., Yongin-si (KR)

(72) Inventors: Sung-Jin Yang, Cheonan-si (KR); Taeik Kim, Asan-si (KR); Hyunsik Park, Cheonan-si (KR); Chungi You, Asan-si (KR); Sungho Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/784,567

(22) Filed: Feb. 7, 2020

(65) Prior Publication Data

US 2020/0257392 A1 Aug. 13, 2020

(30) Foreign Application Priority Data

Feb. 8, 2019 (KR) .................. 10-2019-0015171

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01)

(58) Field of Classification Search
CPC .. G06F 3/0412; G06F 3/04164; G06F 3/0443; G06F 3/0446; G06F 3/047; G06F 2203/04111; H01L 22/32; H01L 27/3225
See application file for complete search history.

(56) References Cited

U.S. PATENT DOCUMENTS

| 2011/0057893 | A1  | 3/2011 | Kim et al. |            |
|--------------|-----|--------|------------|------------|
| 2011/0141037 | A1* | 6/2011 | Hwang      | G06F 3/0443 |
|              |     |        |            | 345/173    |
| 2018/0101270 | A1* | 4/2018 | Cho        | G06F 3/0412 |
| 2018/0182822 | A1* | 6/2018 | Seo        | H01L 27/3248 |
| 2018/0188584 | A1* | 7/2018 | Yeh        | G02F 1/13394 |
| 2019/0272057 | A1* | 9/2019 | Chen       | G06F 3/047 |

FOREIGN PATENT DOCUMENTS

| KR | 101082293   | 11/2011 |
| KR | 20150077831 | 7/2015  |
| KR | 20160041541 | 4/2016  |
| KR | 20160099791 | 8/2016  |

* cited by examiner

*Primary Examiner* — Stacy Khoo
(74) *Attorney, Agent, or Firm* — F. Chau & Associates, LLC

(57) ABSTRACT

A display device includes a display panel and an input sensing panel which includes sensing electrodes disposed on the display panel and which sense an input, sensing lines electrically connected to the sensing electrodes and which include a transparent conductive line disposed on the display panel and a metal line disposed on the transparent conductive line, and an insulating layer disposed between the transparent conductive line and the metal line. A plurality of contact holes are formed which penetrate through the insulating layer and expose the transparent conductive line, and some of the plurality of contact holes are arranged in a widthwise direction of the transparent conductive line.

20 Claims, 20 Drawing Sheets

FIG. 9
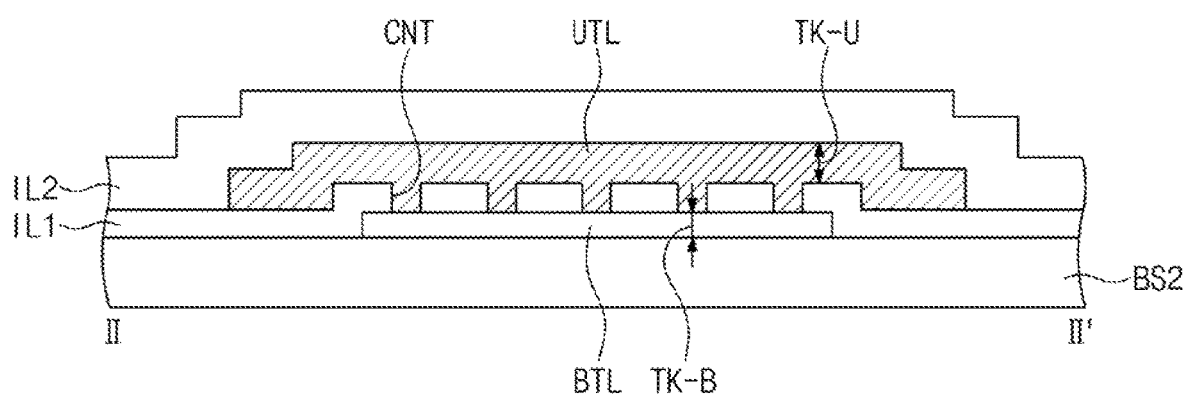
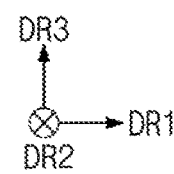

INPUT SENSING PANEL AND DISPLAY DEVICE HAVING THE SAME

CROSS-REFERENCE TO RELATED APPLICATION

This U.S. non-provisional patent application claims priority under 35 U.S.C. § 119 from, and the benefit of, Korean Patent Application No. 10-2019-0015171, filed on Feb. 8, 2019 in the Korean Intellectual Property Office, the contents of which are herein incorporated by reference in their entirety.

BACKGROUND

1. Technical Field

Embodiments of the present disclosure are directed to an input sensing panel that has an improved durability and a display device that incorporates the input sensing panel.

2. Discussion of the Related Art

A display device includes a display panel that displays an image and an input sensing panel that senses an external input. The input sensing panel includes sensing electrodes, sensing lines, and sensing pads. The sensing lines transmit and/or receive signals. When the sensing lines are disconnected, the signals are not transmitted to the sensing electrodes or a driver connected to the sensing pads.

SUMMARY

Embodiments of the present disclosure can provide an input sensing panel that has improved durability.

Embodiments of the present disclosure can provide a display device that has the input sensing panel.

Embodiments of the inventive concept provide a display device which includes a display panel and an input sensing panel. The input sensing panel includes a sensing electrode disposed on the display panel and which senses an input, a sensing line electrically connected to the sensing electrode and which includes a transparent conductive line disposed on the display panel and a metal line disposed on the transparent conductive line, an insulating layer disposed between the transparent conductive line and the metal line, and a plurality of contact holes which penetrate through the insulating layer and expose the transparent conductive line, wherein the metal line is electrically connected to the transparent conductive line through the plurality of contact holes, and some of the plurality of contact holes are arranged in a widthwise direction of the transparent conductive line.

The transparent conductive line has a first thickness less than a second thickness of the metal line.

The transparent conductive line has a first width equal to or less than a second width of the metal line.

Each of the plurality of contact holes has a size equal to or greater than about 4 micrometers and equal to or less than about 40 micrometers.

Each of the plurality of contact holes has a circular shape or a polygonal shape when viewed in a plan view.

The plurality of contact holes are arranged in a first direction and a second direction which crosses the first direction.

The plurality of contact holes include first contact holes each having a first size and second contact holes each having a second size different from the first size.

The sensing line is one of a plurality of sensing lines, the plurality of sensing lines include first sensing lines each having a first width and second sensing lines each having a second width different from the first width, and a size of each of the plurality of contact holes of the first sensing lines differs from a size of each of the plurality of contact holes of the second sensing lines.

The sensing line is one of a plurality of sensing lines, the plurality of sensing lines include first sensing lines each having a first width and second sensing lines each having a second width different from the first width, and a size of each of the plurality of contact holes of the first sensing lines is equal to a size of each of the plurality of contact holes of the second sensing lines.

The sensing line includes a first sensing line area and a second sensing line area, and a number of contact holes per predetermined area in the first sensing line area differs from a number of contact holes per predetermined area in the second sensing line area.

The sensing line includes a first area which extends in a predetermined direction which crosses the widthwise direction and a second area in which an extension direction of the sensing line changes, and a number of contact holes per predetermined area in the first area differs from a number of contact holes per predetermined area in the second area.

A size of each of the plurality of contact holes disposed in the first area is greater than a size of each of the plurality of contact holes disposed in the second area.

The number of contact holes per predetermined area in the first area is less than the number of contact holes per predetermined area in the second area.

The transparent conductive line includes indium tin oxide.

The metal line includes molybdenum.

Embodiments of the inventive concept provide an input sensing panel which includes a base layer, a sensing electrode disposed on the base layer and which senses an input, a transparent conductive line electrically connected to the sensing electrode, an insulating layer disposed on the transparent conductive line, a plurality of contact holes formed in the insulating layer which penetrate therethrough and expose the transparent conductive line, and a metal line disposed on the insulating layer and electrically connected to the transparent conductive line through the plurality of contact holes. Some of the plurality of contact holes are arranged in a widthwise direction of the transparent conductive line when viewed in a plan view.

The transparent conductive line has a first width equal to or less than a second width of the metal line, and the transparent conductive line has a first thickness smaller than a second thickness of the metal line.

Each of the plurality of contact holes has a size equal to or greater than about 4 micrometers and equal to or less than about 40 micrometers.

The transparent conductive line includes indium tin oxide, and the metal line includes molybdenum.

Embodiments of the inventive concept provide a display device which includes a display panel and an input sensing panel. The input sensing panel includes a sensing electrode disposed on the display panel and which senses an input, a sensing line electrically connected to the sensing electrode and which includes a transparent conductive line disposed on the display panel and a metal line disposed on the transparent conductive line, an insulating layer disposed between the transparent conductive line and the metal line, and a plurality of contact holes which penetrate through the insulating layer and expose the transparent conductive line. The transparent conductive line has a first thickness which is less than a second thickness of the metal line and a first width equal to or less than a second width of the metal line, and the metal line is electrically connected to the transparent conductive line through the plurality of contact holes.

Some of the plurality of contact holes may be arranged in a widthwise direction of the transparent conductive line.

According to the above, each of the plurality of sensing lines includes a transparent conductive line and a metal line. Therefore, even if the metal line becomes corroded or oxidized, the probability which the plurality of sensing lines become disconnected is reduced due to the high durability of the transparent conductive line against the corrosion or oxidation. In addition, the metal line is electrically connected to the transparent conductive line through the plurality of contact holes. Since the size of each contact hole is equal to or greater than about 4 micrometers, the metal line can be easily connected to the transparent conductive line through the plurality of contact holes. Thus, a probability which the metal line and the transparent conductive line are not connected to each other may be reduced. In addition, since the size of each of the plurality of contact holes is equal to or less than about 40 micrometers, the contact area between the metal line and the transparent conductive line does not exceed a predetermined area. Thus, the layer separation defect can be reduced.

BRIEF DESCRIPTION OF THE DRAWINGS

FIG. 9 is a cross-sectional view taken along a line II-II' in FIG. 8.

DETAILED DESCRIPTION

Figure 1:
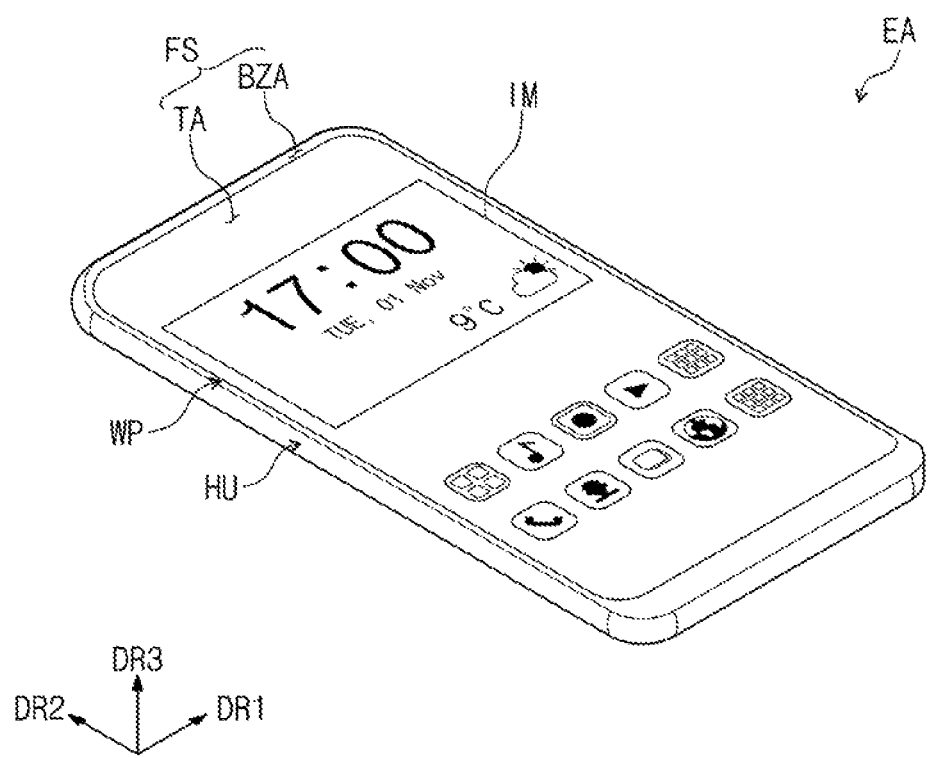
FIG. 1 is an assembled perspective view of a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

Hereinafter, exemplary embodiments of the present disclosure will be explained in detail with reference to the accompanying drawings.

Figure 2:
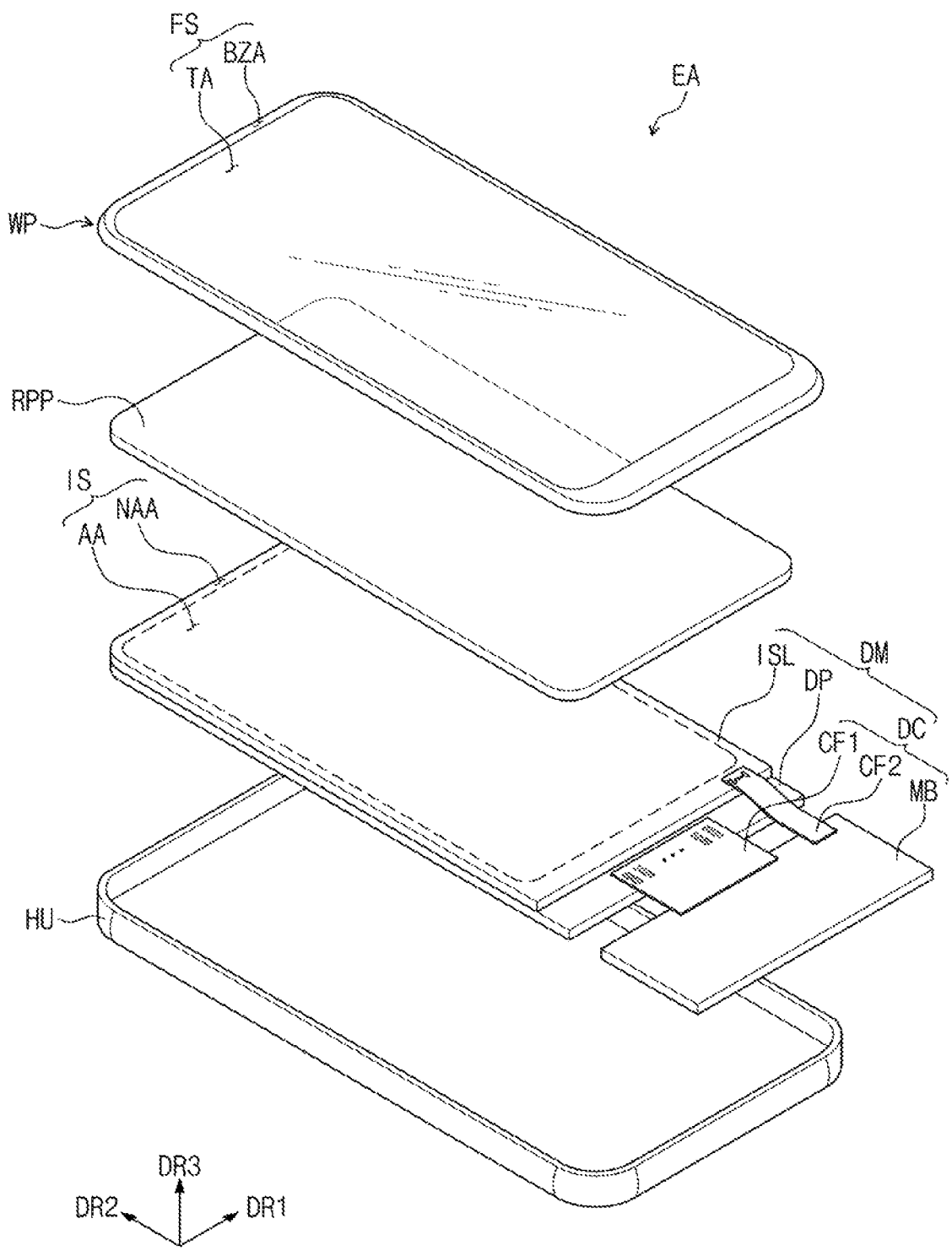
FIG. 2 is an exploded perspective view of a display device according to an exemplary embodiment of the present disclosure.

FIG. 1 is an assembled perspective view of a display device EA according to an exemplary embodiment of the present disclosure. FIG. 2 is an exploded perspective view of the display device EA according to an exemplary embodiment of the present disclosure.

Referring to FIGS. 1 and 2, according to an embodiment, the display device EA is activated in response to an electrical signal. The display device EA includes various embodiments. For example, the display device EA can be incorporated into a large-sized electronic item, such as a television set, a monitor, or an outdoor billboard, or a small and medium-sized electronic item, such as a personal computer, a notebook computer, a personal digital assistant, a navigation unit, a game unit, a mobile electronic device, or a camera. These are merely exemplary, and thus the display device EA can be incorporated into other electronic devices consistent with concepts of the present disclosure. In a present exemplary embodiment, a smartphone will be described as a representative example of the display device EA.

According to an embodiment, the display device EA displays an image IM through a display surface FS, which is substantially parallel to a plane defined by a first direction DR1 and a second direction DR2, toward a third direction DR3. The image IM may include a motion image or a still image. FIG. 1 shows a clock window and icons as a representative example of the image IM. The display surface FS, through which the image IM is displayed, corresponds to a front surface of the display device EA and a front surface of a window panel WP.

In a present exemplary embodiment, front (or upper) and rear (or lower) surfaces of each member of the display device EA are defined with respect to a direction in which the image IM is displayed. The front and rear surfaces are opposite to each other in the third direction DR3, and a normal line direction of each of the front and rear surfaces is substantially parallel to the third direction DR3. Directions indicated by the first, second, and third directions DR1, DR2, and DR3 are relative to each other, and thus the directions indicated by the first, second, and third directions DR1, DR2, and DR3 may be changed to other directions. In the following descriptions, the expression "when viewed in a plan view" means a state of being viewed from the third direction DR3.

According to an embodiment, the display device EA includes the window panel WP, an anti-reflective panel RPP, a display module DM, and a housing HU. In a present exemplary embodiment, the window panel WP and the housing HU are coupled to each other to provide an exterior of the display device EA.

According to an embodiment, the window panel WP includes an optically transparent insulating material. For example, the window panel WP includes a glass or a plastic material. The window panel WP has a single-layer or multi-layer structure. For example, the window panel WP includes a plurality of plastic films attached to each other by an adhesive, or a glass substrate with a plastic film attached thereto by an adhesive.

According to an embodiment, the front surface FS of the window panel WP is the front surface of the display device EA as described above. A transmissive area TA is an optically transparent area. For example, the transmissive area TA has a visible light transmittance of about 90% or more.

According to an embodiment, a bezel area BZA has a relatively lower transmittance as compared with the transmissive area TA. A shape of the bezel area BZA determines a shape of the transmissive area TA. The bezel area BZA is disposed to adjacent to the transmissive area TA and surrounds the transmissive area TA.

According to an embodiment, the bezel area BZA has a predetermined color. The bezel area BZA covers a peripheral area NAA of the display module DM to prevent the peripheral area NAA from being externally visible. However, this is merely exemplary, and the bezel area BZA may be omitted from the window panel WP according to exemplary embodiments of the present disclosure.

According to an embodiment, the anti-reflective panel RPP is disposed under the window panel WP. The anti-reflective panel RPP reduces a reflectance of external light incident thereto from above the window panel WP. In a present exemplary embodiment, the anti-reflective panel RPP may be omitted or may be included in the display module DM.

According to an embodiment, the display module DM displays the image IM and senses an external input. The display module DM includes a front surface IS that includes an active area AA and the peripheral area NAA. The active area AA can be activated in response to an electrical signal.

In a present exemplary embodiment, the active area AA is an area through which the image IM is displayed and the external input is sensed. The transmissive area TA overlaps with at least the active area AA. For example, the transmissive area TA overlaps with an entire surface or at least a portion of the active area AA. Accordingly, a user perceives the image IM or provides an external input through the transmissive area TA, however, embodiments are not limited thereto. That is, in other embodiments, an area through which the image IM is displayed and an area through which an external input is sensed can be separated from each other in the active area AA.

According to an embodiment, the peripheral area NAA is covered by the bezel area BZA. The peripheral area NAA is disposed adjacent to the active area AA. The peripheral area NAA surrounds the active area AA. A driving circuit or a driving wiring line can be disposed in the peripheral area NAA to drive the active area AA.

According to an embodiment, the display module DM includes a display panel DP, an input sensing panel ISL, and a driving circuit DC.

According to an embodiment, the display panel DP includes configurations appropriate to generate the image IM. The image IM generated by the display panel DP is perceived by the user through the transmissive area TA.

According to an embodiment, the input sensing panel ISL senses an external input received from the outside. As described above, the input sensing panel ISL senses an external input applied to the window panel WP.

According to an embodiment, the driving circuit DC is electrically connected to the display panel DP and the input sensing panel ISL. The driving circuit DC includes a main circuit board MB, a first circuit board CF1, and a second circuit board CF2.

According to an embodiment, the first circuit board CF is electrically connected to the display panel DP. The first circuit board CF1 connects the display panel DP and the main circuit board MB. In a present exemplary embodiment, the first circuit board CF1 is depicted as a flexible circuit film, however, embodiments are not limited thereto. In other embodiments, the first circuit board CF1 is not connected to the main circuit board MB and may be rigid.

According to an embodiment, the first circuit board CF1 is connected to display pads of the display panel DP, which are disposed in the peripheral area NAA. The first circuit board CF1 transmits electrical signals to the display panel DP that drive the display panel DP. The electrical signals are generated by the first circuit board CF1 or the main circuit board MB.

According to an embodiment, the second circuit board CF2 is electrically connected to the input sensing panel ISL. The second circuit board CF2 connects the input sensing panel ISL and the main circuit board MB. In a present exemplary embodiment, the second circuit board CF2 is depicted as a flexible circuit film, however, embodiments are not limited thereto. In other embodiments, the second circuit board CF2 is not connected to the main circuit board MB and may be rigid.

According to an embodiment, the second circuit board CF2 is connected to sensing pads of the input sensing panel ISL, which are disposed in the peripheral area NAA. The second circuit board CF2 transmits electrical signals to the input sensing panel ISL that drive the input sensing panel ISL. The electrical signals are generated by the second circuit board CF2 or the main circuit board MB.

According to an embodiment, the main circuit board MB includes various driving circuits that drive the display module DM and a connector that provides power. The first and second circuit boards CF1 and CF2 are connected to the main circuit board MB. According to a present embodiment, the display module DM can be easily controlled using one main circuit board MB, however, embodiments are not limited thereto. In other embodiments, the display panel DP and the input sensing panel ISL may be connected to different main circuit boards, and one of the first and second circuit boards CF1 and CF2 may not be connected to the main circuit board MB.

According to an embodiment, the housing HU is coupled to the window panel WP. The housing HU is coupled to the window panel WP and provides a predetermined inner space. The display module DM is accommodated in the inner space.

According to an embodiment, the housing HU includes a rigid material. For example, the housing HU includes glass, plastic, or a metal, or a plurality of frames and/or plates of combinations thereof. The housing HU stably protects the components of the display device EA accommodated in the inner space from external impacts.

Figure 3A:
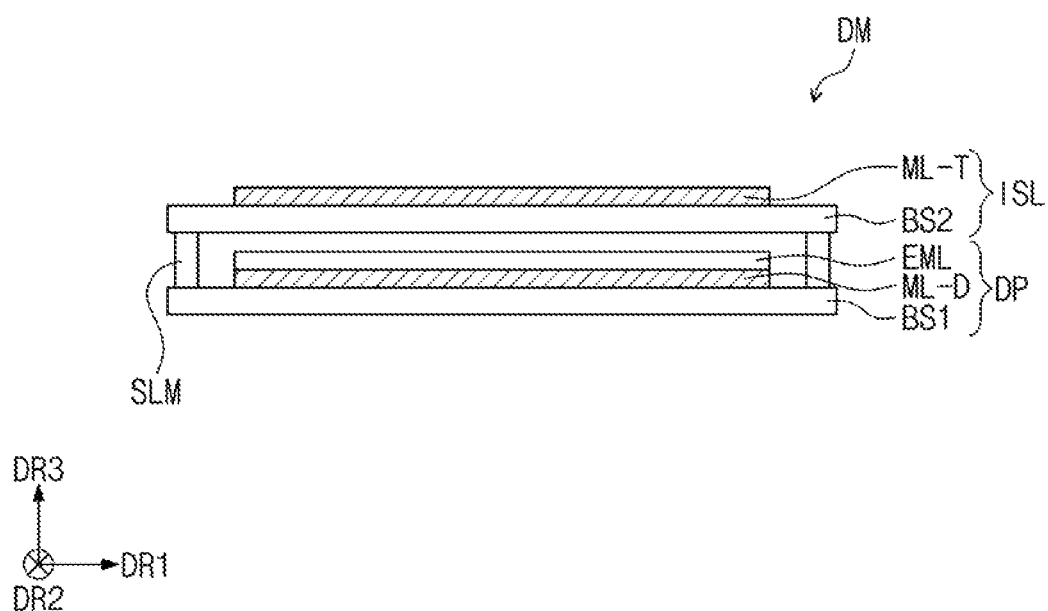
FIG. 3A is a cross-sectional view of a display device according to an exemplary embodiment of the present disclosure.

FIG. 3A is a cross-sectional view illustrating a display device according to an exemplary embodiment of the present disclosure.

Referring to FIG. 3A, according to an embodiment, a display module DM includes a display panel DP, an input sensing panel ISL, and a coupling member SLM. The display panel DP according to an exemplary embodiment of the present disclosure may be a light emitting type display panel, however, embodiments are not limited thereto. For example, in other embodiments, the display panel DP may be an organic light emitting display panel or a quantum dot light emitting display panel.

According to an embodiment, the display panel DP includes a first substrate BS1, a display circuit layer ML-D, and an image display layer EML. The input sensing panel ISL includes a second substrate BS2 and a sensing circuit layer ML-T.

According to an embodiment, each of the first substrate BS1 and the second substrate BS2 may be a silicon substrate, a plastic substrate, a glass substrate, an insulating film, or a laminated structure that includes a plurality of insulating layers.

According to an embodiment, the display circuit layer ML-D is disposed on the first substrate BS1. The display circuit layer ML-D includes a plurality of insulating layers, a plurality of conductive layers, and a semiconductor layer. The conductive layers of the display circuit layer ML-D form signal lines or a pixel control circuit.

According to an embodiment, the image display layer EML is disposed on the display circuit layer ML-D. The image display layer EML generates light or controls light transmittance. For example, the image display layer EML of an organic light emitting display panel includes an organic light emitting material. The image display layer EML of a quantum dot light emitting display panel includes at least one of a quantum dot and a quantum rod. The image display layer EML of a liquid crystal display panel includes a liquid crystal layer.

According to an embodiment, the second substrate BS2 is disposed on the image display layer EML. A predetermined space is formed between the second substrate BS2 and the image display layer EML. The space is filled with air or inert gas. In addition, in an exemplary embodiment of the present disclosure, the space may be filled with a filler, such as a silicon-based polymer, an epoxy-based resin, or an acrylic-based resin.

According to an embodiment, the sensing circuit layer ML-T is disposed on the second substrate BS2. The sensing circuit layer ML-T includes a plurality of insulating layers and a plurality of conductive layers. The conductive layers form a sensing electrode that senses the external input, a sensing line connected to the sensing electrode, and a sensing pad connected to the sensing line.

According to an embodiment, the coupling member SLM is disposed between the first substrate BS1 and the second substrate BS2. The coupling member SLM couples the first substrate BS1 with the second substrate BS2. The coupling member SLM may include an organic material, such as a light curable resin or a light plastic resin, or an inorganic material, such as a frit seal, however, embodiments are not limited thereto.

Figure 3B:
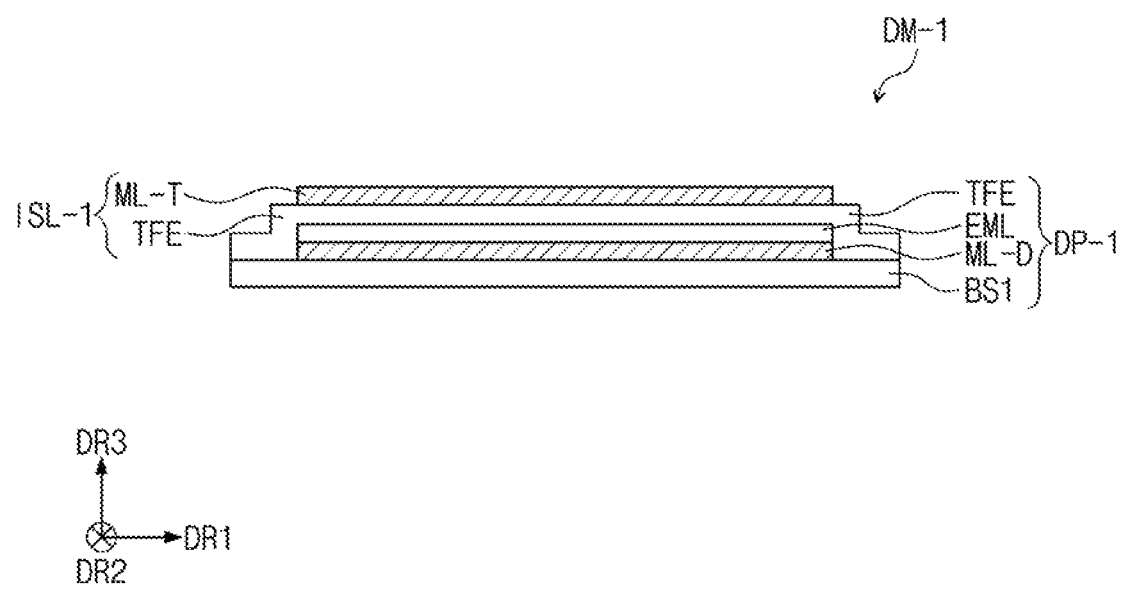
FIG. 3B is a cross-sectional view of a display device according to an exemplary embodiment of the present disclosure.

FIG. 3B is a cross-sectional view of a display device according to an exemplary embodiment of the present disclosure.

Referring to FIG. 3B, according to an embodiment, a display module DM-1 includes a display panel DP-1 and an input sensing panel ISL-1. The input sensing panel ISL-1 may be referred to as an input sensing layer.

According to an embodiment, the display panel DP-1 includes a first substrate BS1, a display circuit layer ML-D, an image display layer EML, and a thin film encapsulation layer TFE. The input sensing panel ISL-1 includes a base layer TFE and a sensing circuit layer ML-T. The thin film encapsulation layer TFE and the base layer TFE have the same configuration.

According to an exemplary embodiment of the present disclosure, the display panel DP-1 and the input sensing panel ISL-1 are formed through continuous processes. That is, the sensing circuit layer ML-T is directly formed on the thin film encapsulation layer TFE.

Figure 4A:
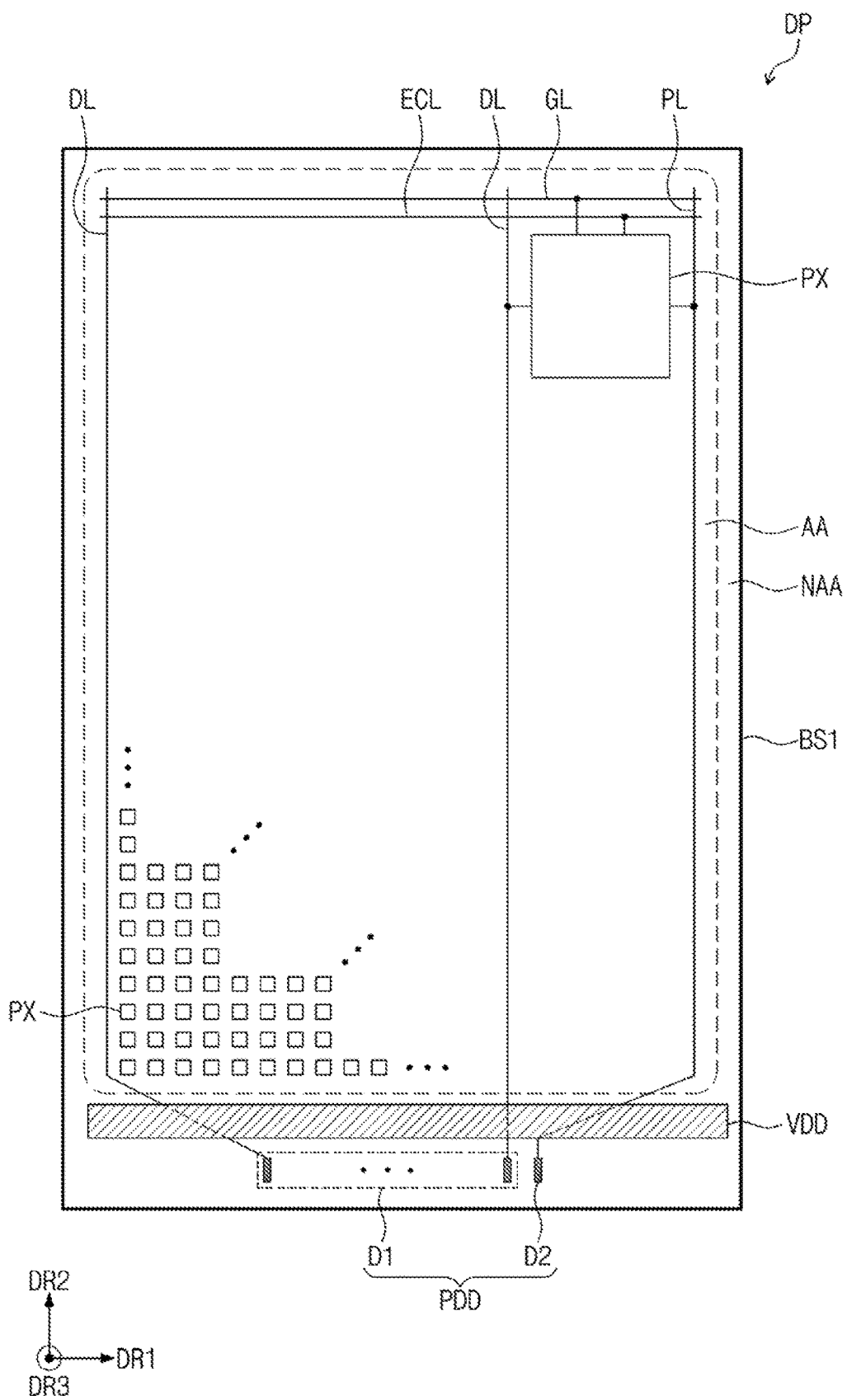
FIG. 4A is a plan view of a display panel according to an exemplary embodiment of the present disclosure.
Figure 4B:
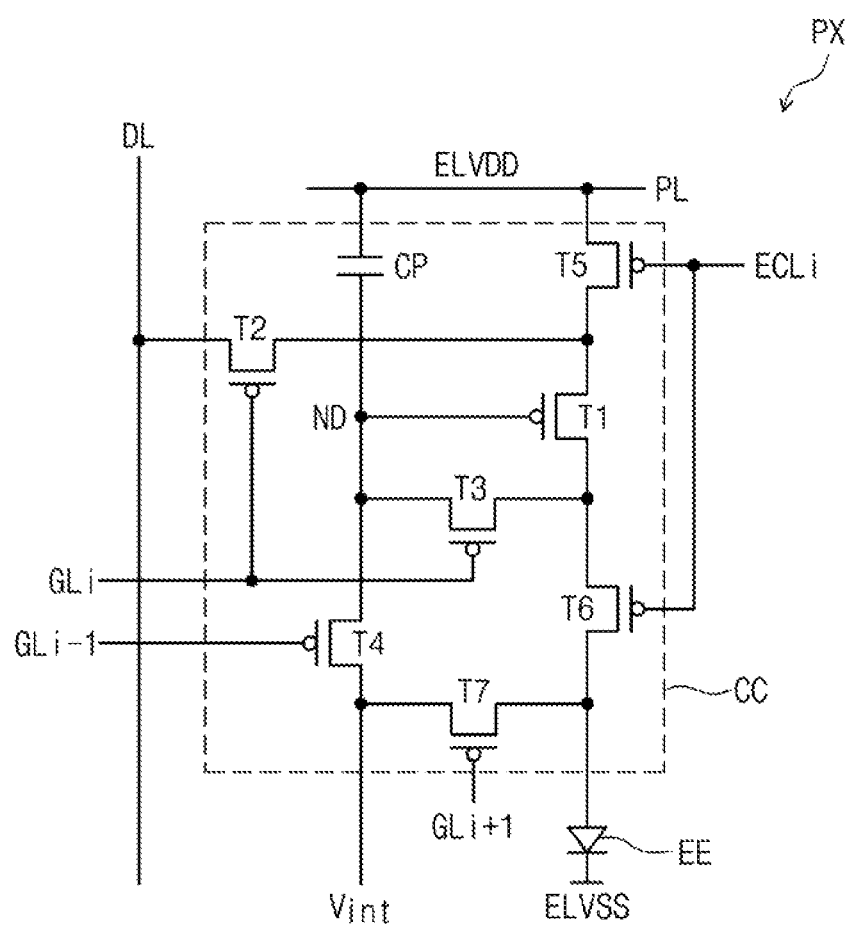
FIG. 4B is an equivalent circuit diagram of a pixel according to an exemplary embodiment of the present disclosure.

FIG. 4A is a plan view of a display panel DP according to an exemplary embodiment of the present disclosure. FIG. 4B is an equivalent circuit diagram of a pixel PX according to an exemplary embodiment of the present disclosure.

Referring to FIG. 4A, according to an embodiment, the display panel DP includes a plurality of pixels PX, a plurality of signal lines GL, DL, PL, and ECL, and a plurality of display pads PDD.

According to an embodiment, the active area AA of the display panel DP is the area through which an image is displayed, and the peripheral area NAA is the area in which a driving circuit or a driving line is disposed. FIG. 4A illustrates the active area AA and the peripheral area NAA of the display panel DP. The pixels PX are disposed in the active area AA.

According to an embodiment, the signal lines GL, DL, PL, and ECL are connected to the pixels PX to transmit electrical signals to the pixels PX. Among the signal lines included in the display panel DP, a scan line GL, a data line DL, a power line PL, and a light emitting control line ECL are shown as representative examples, however, embodiments are not limited thereto. In other embodiments, the signal lines GL, DL, PL, and ECL may further include, e.g., an initialization voltage line. FIG. 4B illustrates an enlarged view of a signal circuit diagram of one pixel PX as a representative example. FIG. 4B illustrates the pixel PX connected to an i-th scan line GLi and an i-th light emitting control line ECLi.

According to an embodiment, the pixel PX includes a light emitting element EE and a pixel circuit CC.

According to an embodiment, the pixel circuit CC includes a plurality of transistors T1 to T7 and a capacitor CP. The transistors T1 to T7 are formed through a low temperature polycrystalline silicon (LTPS) process or a low temperature polycrystalline oxide (LTPO) process.

According to an embodiment, the pixel circuit CC controls an amount of current that flows through the light emitting element EE in response to a data signal. The light emitting element EE emits light at a predetermined luminance in response to the amount of the current received from the pixel circuit CC. To this end, a level of a first power voltage ELVDD is set higher than a level of a second power voltage ELVSS. The light emitting element EE may include an organic light emitting element or a quantum dot light emitting element.

According to an embodiment, each of the transistors T1 to T7 includes an input or source electrode, an output or drain electrode, and a control or gate electrode. In the following descriptions, for the convenience of explanation, one electrode of the input electrode and the output electrode is referred to as a "first electrode", and the other electrode of the input electrode and the output electrode is referred to as a "second electrode".

According to an embodiment, the first electrode of the first transistor T1 is connected to the power line PL which supplies the first power voltage ELVDD via the fifth transistor T5, and the second electrode of the first transistor T1 is connected to an anode electrode of the light emitting element EE via the sixth transistor T6. The first transistor T1 may be referred to as a "driving transistor" in the present disclosure.

According to an embodiment, the first transistor T1 controls the amount of current that flows through the light emitting element EE in response to a voltage applied to the control electrode of the first transistor T1.

According to an embodiment, the second transistor T2 is connected between the data line DL and the first electrode of the first transistor T1. The control electrode of the second transistor T2 is connected to the i-th scan line GLi. When an i-th scan signal is transmitted to the i-th scan line GLi, the second transistor T2 is turned on and connects the data line DL to the first electrode of the first transistor T1.

According to an embodiment, the third transistor T3 is connected between the second electrode of the first transistor T1 and the control electrode of the first transistor T1. The control electrode of the third transistor T3 is connected to the i-th scan line GLi. When the i-th scan signal is transmitted to the i-th scan line GLi, the third transistor T3 is turned on and connects the second electrode of the first transistor T1 to the control electrode of the first transistor T1. Accordingly, when the third transistor T3 is turned on, the first transistor T1 is connected in a diode configuration.

According to an embodiment, the fourth transistor T4 is connected between a node ND and the initialization voltage line which supplies an initialization voltage Vint. The control electrode of the fourth transistor T4 is connected to an (i−1)th scan line GLi−1. When an (i−1)th scan signal is transmitted to the (i−1)th scan line GLi−1, the fourth transistor T4 is turned on and provides the initialization voltage Vint to the node ND.

According to an embodiment, the fifth transistor T5 is connected between the power line PL and the first electrode of the first transistor T1. The control electrode of the fifth transistor T5 is connected to the i-th light emitting control line ECLi.

According to an embodiment, the sixth transistor T6 is connected between the second electrode of the first transistor T1 and the anode electrode of the light emitting element EE. The control electrode of the sixth transistor T6 is connected to the i-th light emitting control line ECLi.

According to an embodiment, the seventh transistor T7 is connected between the initialization voltage line which supplies the initialization voltage Vint and the anode electrode of the light emitting element EE. The control electrode of the seventh transistor T7 is connected to an (i+1)th scan line GLi+1. When an (i+1)th scan signal is transmitted to the (i+1)th scan line GLi+1, the seventh transistor T7 is turned on and transmits the initialization voltage Vint to the anode electrode of the light emitting element EE.

According to an embodiment, the seventh transistor T7 improves black expression ability. In detail, when the seventh transistor T7 is turned on, a parasitic capacitance of the light emitting element EE is discharged. Accordingly, when displaying black, light due to a leakage current from the first transistor T1 is not emitted by the light emitting element EE, and thus the black expression ability is improved.

In addition, according to an embodiment, FIG. 4B shows the control electrode of the seventh transistor T7 as being connected to the (i+1)th scan line GLi+1, however, embodiments are not limited thereto. According to another embodiment, the control electrode of the seventh transistor T7 may be connected to the i-th scan line GLi or the (i−1)th scan line GLi−1.

According to an embodiment, the capacitor CP is disposed between the power line PL and the node ND. The capacitor CP is charged with a voltage that corresponds to the data signal. When the fifth and sixth transistors T5 and T6 are turned on, the amount of the current that flows through the first transistor T1 is determined by the voltage charged in the capacitor CP.

According to embodiments, the equivalent circuit of the pixel PX is not limited to the equivalent circuit shown in FIG. 4B. The pixel PX can be implemented in various ways in other embodiments to allow the light emitting element EE to emit light. FIG. 4B illustrates a PMOS as a reference of the pixel circuit CC, however, embodiments are not limited thereto. According to another embodiment, the pixel circuit CC is implemented by an NMOS. According to another embodiment, the pixel circuit CC is implemented by a combination of an NMOS and a PMOS.

Referring to FIG. 4A again, according to an embodiment, a power pattern VDD is disposed in the peripheral area NAA. The power pattern VDD is connected to the power lines PL. Accordingly, the display panel DP includes the power pattern VDD, and thus the pixels PX receive the same first power supply signal.

According to an embodiment, the display pads PDD include a first pad D1 and a second pad D2. A plurality of first pads D1 are provided, and the first pads D1 are respectively connected to the data lines DL. The second pad D2 is connected to the power pattern VDD to be electrically connected to the power line PL. The display panel DP transmits electrical signals received from the outside through the display pads PDD to the pixels PX. In addition, the display pads PDD further include pads that receive other electrical signals in addition to the first and second pads D1 and D2 and should not be limited to a particular embodiment.

Figure 5:
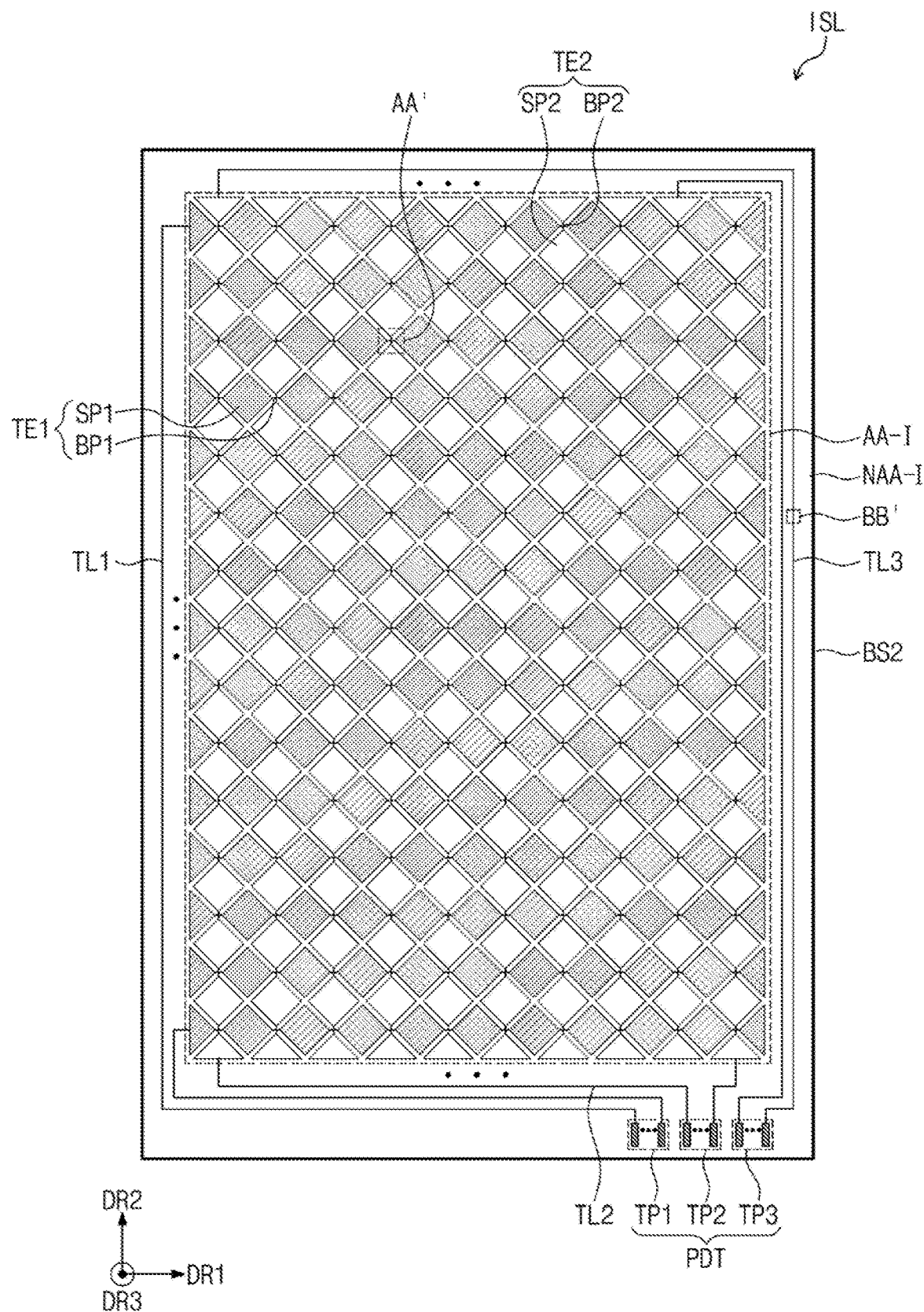
FIG. 5 is a plan view of an input sensing panel according to an exemplary embodiment of the present disclosure.

FIG. 5 is a plan view of an input sensing panel ISL according to an exemplary embodiment of the present disclosure. Hereinafter, the input sensing panel ISL shown in FIG. 5 will be described with reference to the input sensing panel ISL shown in FIG. 3A, however, the following descriptions is applicable to the input sensing panel ISL-1 shown in FIG. 3B.

Referring to FIG. 5, according to an embodiment, the input sensing panel ISL includes the second substrate BS2, a first sensing electrode TE1, a second sensing electrode TE2, a plurality of sensing lines TL1, TL2, and TL3, and a plurality of sensing pads PDT. The first sensing electrode TE1, the second sensing electrode TE2, the plurality of sensing lines TL1, TL2, and TL3, and the plurality of sensing pads PDT form the sensing circuit layer ML-T shown in FIG. 3A.

According to an embodiment, the second substrate BS2 includes an active area AA-I and a peripheral area NAA-I. The peripheral area NAA-I surrounds the active area AA-I.

According to an embodiment, the first sensing electrode TE1 and the second sensing electrode TE2 are disposed in the active area AA-I. The input sensing panel ISL obtains information on an external input according to variations in capacitance between the first sensing electrode TE1 and the second sensing electrode TE2.

According to an embodiment, the first sensing electrode TE1 includes first sensing patterns SP1 and first connection patterns BP1. At least one first connection pattern BP1 is connected to two adjacent first sensing patterns SP1. The second sensing electrode TE2 includes second sensing patterns SP2 and second connection patterns BP2. At least one second connection pattern BP2 is connected to two adjacent second sensing patterns SP2.

According to an embodiment, the sensing lines TL1, TL2, and TL3 are disposed in the peripheral area NAA-I. The sensing lines TL1, TL2, and TL3 include a first sensing line TL1, a second sensing line TL2, and a third sensing line TL3.

According to an embodiment, the first sensing line TL1 is connected to the first sensing electrode TE1. The second sensing line TL2 is connected to one end of the second sensing electrode TE2. The third sensing line TL3 is connected to the other end of the second sensing electrode TE2. The other end of the second sensing electrode TE2 is opposite to the one end of the second sensing electrode TE2.

According to a present disclosure, the second sensing electrode TE2 is connected to the second sensing line TL2 and the third sensing line TL3. The second sensing electrode TE2 is longer than the first sensing electrode TE1. Therefore, the sensitivity may be non-uniform depending on the position in the second sensing electrode TE2. However, according to a present embodiment, since the second sensing line TL2 and the third sensing line TL3 are connected to the second sensing electrode TE2, the non-uniformity of the sensitivity can be prevented. However, this is merely exemplary, and embodiments are not limited thereto. In other embodiments, the third sensing line TL3 is omitted.

According to an embodiment, the sensing pads PDT are disposed in the peripheral area NAA-I. The sensing pads PDT include a first sensing pad TP1, a second sensing pad TP2, and a third sensing pad TP3. The first sensing pad TP1 is connected to the first sensing line TL1 and electrically connected to the first sensing electrode TE1. The second sensing pad TP2 is connected to the second sensing line TL2, and the third sensing pad TP3 is connected to the third sensing line TL3. Therefore, the second sensing pad TP2 and the third sensing pad TP3 are electrically connected to the second sensing electrode TE2.

The first sensing line TL1 has a first width that is less than a second width of the first sensing pad TP1, the second sensing line TL2 has a first width that is less than a second width of the second sensing pad TP2, and the third sensing line TL3 has a first width that is less than a second width of the third sensing pad TP3.

Figure 6:
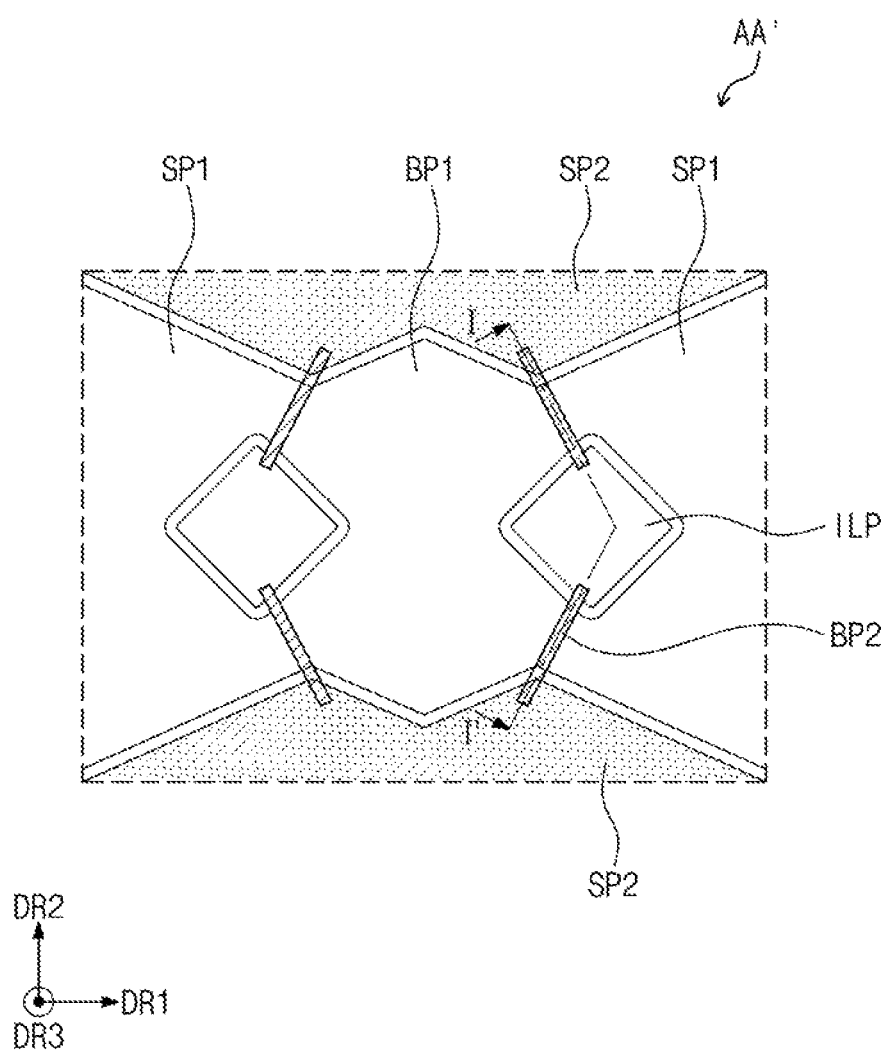
FIG. 6 is an enlarged plan view of a portion AA' in FIG. 5.
Figure 7:
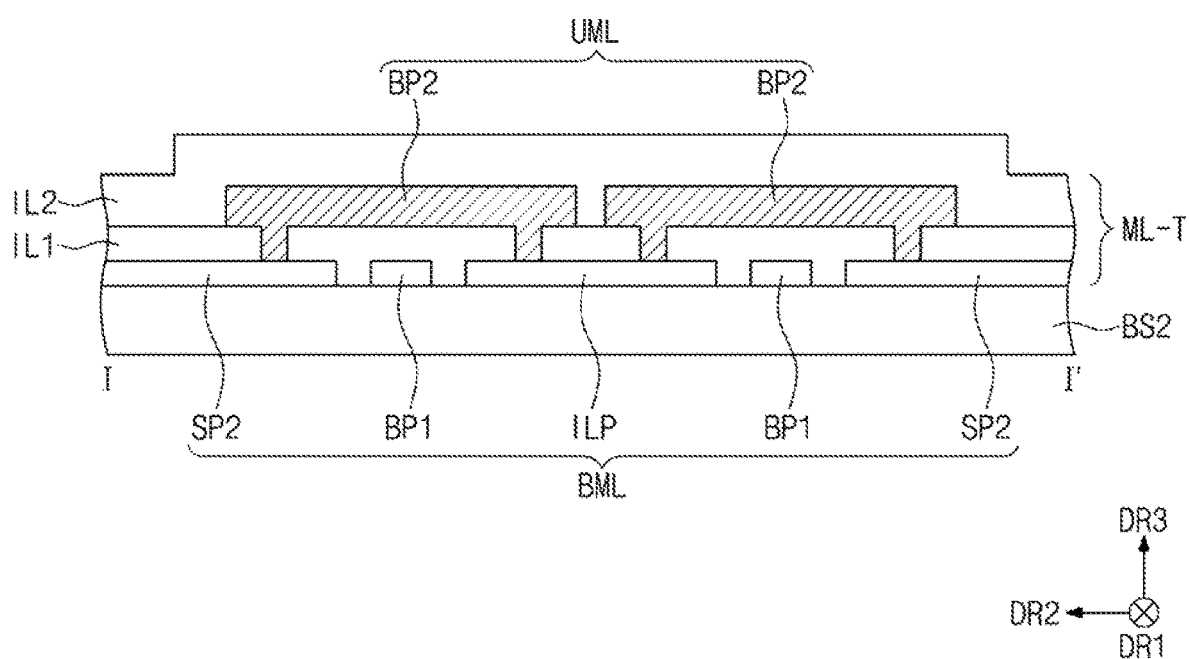
FIG. 7 is a cross-sectional view taken along a line I-I' in FIG. 6.

FIG. 6 is an enlarged plan view of a portion AA' in FIG. 5. FIG. 7 is a cross-sectional view taken along a line I-I' in FIG. 6.

Referring to FIGS. 6 and 7, according to an embodiment, the sensing circuit layer ML-T is disposed on the second substrate BS2. The sensing circuit layer ML-T includes a first conductive layer BML, a first insulating layer IL1 disposed on the first conductive layer BML, a second conductive layer UML disposed on the first insulating layer IL1, and a second insulating layer IL2 disposed on the second conductive layer UML.

According to an embodiment, the first conductive layer BML includes a transparent conductive material. In the following descriptions, the term "transparent" means that a transmittance of light is equal to or greater than a predetermined reference. For example, the predetermined reference is about 90% or more, however, embodiments of the present disclosure are not limited thereto. The first conductive layer BML includes a transparent conductive oxide, such as at least one of indium tin oxide ITO, indium zinc oxide IZO, indium gallium oxide IGO, indium gallium zinc oxide IGZO, or mixtures/compounds thereof, however, embodiments are not limited thereto.

According to an embodiment, the first conductive layer BML includes the first sensing patterns SP1, the first connection patterns BP1, and the second sensing patterns SP2. In addition, the first conductive layer BML further includes an island pattern ILP. The island pattern ILP is insulated from the first sensing patterns SP1 and the first connection patterns BP1 and is electrically connected to the second sensing patterns SP2.

According to an embodiment, the first insulating layer IL1 covers the first conductive layer BML. The first insulating layer IL1 includes an inorganic material. The inorganic material may include at least one of silicon oxide, silicon nitride, silicon oxynitride, titanium oxide, or aluminum oxide.

According to an embodiment, the second conductive layer UML includes an opaque conductive material. For example, the second conductive layer UML may include a metal, such as molybdenum, silver, titanium, copper, aluminum, or an alloy thereof. The alloy may be molybdenum niobium.

According to an embodiment, the second conductive layer UML includes the second connection patterns BP2. In an exemplary embodiment of the present disclosure, four second connection patterns BP2 are used to connect two second sensing patterns SP2, however, embodiments are not limited thereto. That is, in other embodiments, each of the second connection patterns BP2 is connected to one second sensing pattern SP2 and the island pattern ILP. The two second sensing patterns SP2 are spaced apart from each other and electrically connected to each other by the second connection patterns BP2 and the island pattern ILP.

According to an embodiment, the second insulating layer IL2 covers the second conductive layer UML. The second insulating layer IL2 includes an inorganic material, such as at least one of silicon oxide, silicon nitride, silicon oxynitride, titanium oxide, or aluminum oxide.

Figure 8:
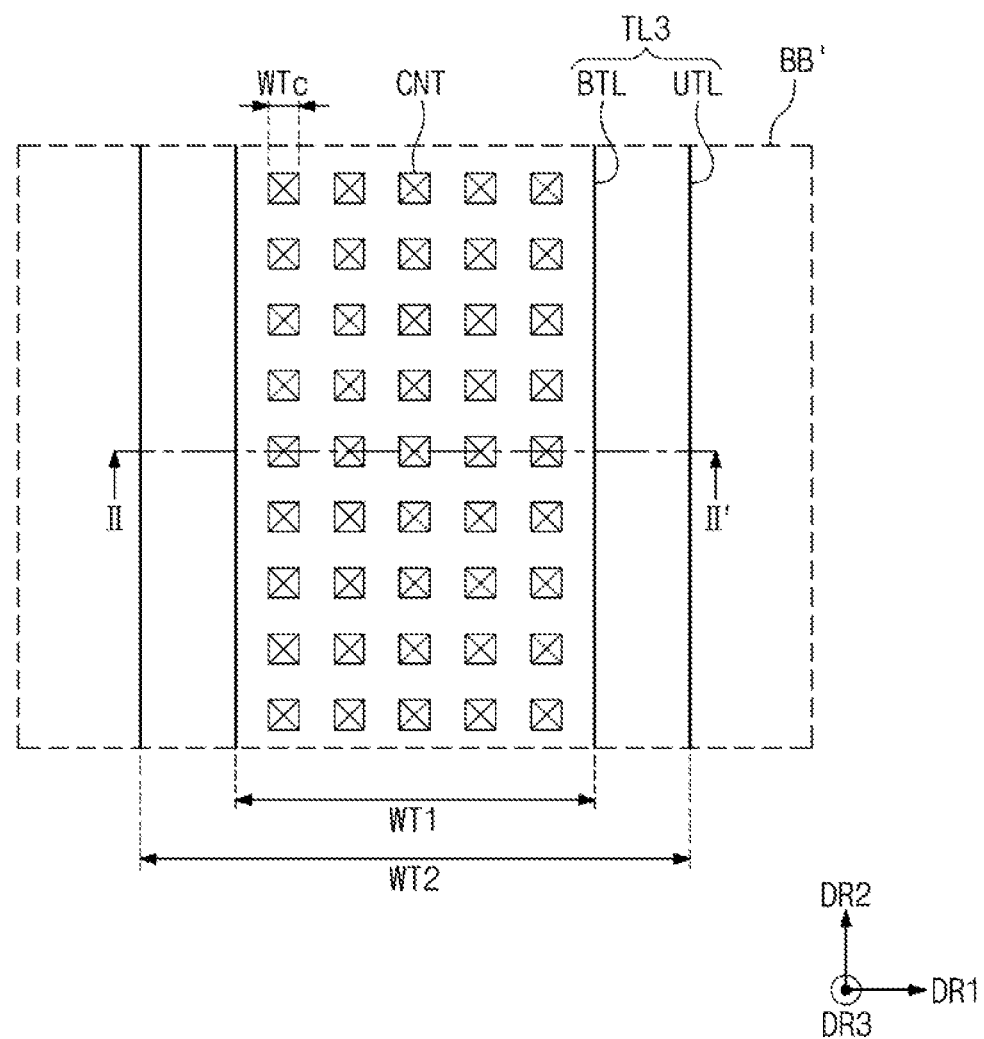
FIG. 8 is an enlarged plan view of a portion BB' in FIG. 5.

FIG. 8 is an enlarged plan view of a portion BB' in in FIG. 5. FIG. 9 is a cross-sectional view taken along a line II-II' in FIG. 8.

According to an embodiment, FIGS. 8 and 9 show an enlarged third sensing line TL3. Since the first and second sensing lines TL1 and TL2 shown in FIG. 5 have substantially the same structure as the third sensing line TL3, descriptions on the first and second sensing lines T1 and TL2 are omitted.

According to an embodiment, the third sensing line TL3 includes a transparent conductive line BTL and a metal line UTL. The transparent conductive line BTL is disposed on the second substrate BS2, and formed by the same material as that of the first conductive layer BML. The metal line UTL is disposed on the transparent conductive line BTL, and formed by the same material as that of the second conductive layer UML. A first insulating layer IL1 is disposed between the transparent conductive line BTL and the metal line UTL. The first insulating layer IL1 is provided with a plurality of contact holes CNT that penetrate therethrough, and the metal line UTL is electrically connected to the transparent conductive line BTL through the contact holes CNT.

According to an embodiment, each of the contact holes CNT has a rectangular shape when viewed in a plan view, and a size WTc is a length of a side in one direction of each of the contact holes CNT. The size WTc of each of the contact holes CNT is equal to or greater than about 4 micrometers and equal to or less than about 40 micrometers. For example, the size WTc is about 6 micrometers.

According to an embodiment, when the size WTc is less than about 4 micrometers, the metal line UTL does not pass through the contact holes CNT, and the metal line UTL and the transparent conductive line BTL will not make contact with each other.

According to an embodiment, a first adhesion between the first insulating layer IL1 and the transparent conductive line BTL is greater than a second adhesion between the first insulating layer IL1 and the metal line UTL and a third adhesion between the transparent conductive line BTL and the metal line UTL. The second adhesion is greater than the third adhesion. Accordingly, when the size WTc is greater than about 40 micrometers, a contact area between the transparent conductive line BTL and the metal line UTL increases, and thus defects in which the layers separate can occur. The separation of layers means that the metal line UTL is separated from the transparent conductive line BTL.

According to an exemplary embodiment of the present disclosure, the metal line UTL is stably electrically connected to the transparent conductive line BTL through the contact holes CNT, and thus a durability of the input sensing panel ISL can be improved. Since the size of the contact holes CNT is equal to or greater than about 4 micrometers, the metal line UTL can be easily connected to the transparent conductive line BTL through the contact holes CNT. Therefore, a probability that the metal line UTL and the transparent conductive line BTL are not connected to each other is reduced. In addition, since the size of the contact holes CNT is equal to or less than about 40 micrometers, the contact area between the metal line UTL and the transparent conductive line BTL does not exceed a predetermined area. Thus, the layer separation defect can be reduced.

According to an embodiment, the contact holes CNT are arranged in a matrix form along the first direction DR1 and the second direction DR2. Some of the contact holes CNT are arranged in a widthwise direction of the transparent conductive line BTL. The transparent conductive line BTL extend in the second direction DR2, and the widthwise direction of the transparent conductive line BTL is the first direction DR1 that crosses the second direction DR2. FIG. 8 shows an example in which five contact holes are arranged in the first direction DR1, however, embodiments of the present disclosure are not limited thereto. For example, in other embodiments, the number of the contact holes CNT arranged in the widthwise direction can be more or less than five, depending on the size WTc of the contact holes CNT or the width of the transparent conductive line BTL.

According to an embodiment, a second insulating layer IL2 is disposed on the metal line UTL and covers the metal line UTL.

According to an exemplary embodiment of the present disclosure, the third sensing line TL3 include two conductive layers, such as the metal line UTL and the transparent conductive line BTL. Accordingly, the defect in which the third sensing line TL3 becomes disconnected can be reduced. When the third sensing line TL3 includes only the metal line UTL, the third sensing line TL3 can be disconnected as the metal line UTL corrodes or oxidizes. In addition, the corrosion or oxidation may not be detected during a test process since it is a progressive defect. According to an exemplary embodiment of the present disclosure, even if the metal line UTL becomes corroded or oxidized, disconnections of the third sensing line TL3 can be mini- mized to since the transparent conductive line BTL is highly durable against corrosion or oxidation and is disposed under the metal line UTL.

In addition, according to an embodiment, a thickness TK-B of the transparent conductive line BTL is less than a thickness TK-U of the metal line UTL. For example, the thickness TK-U of the metal line UTL is about several thousand angstroms, and the thickness TK-B of the transparent conductive line BTL is about several hundred angstroms. Further, the metal line UTL has a higher ductility than the transparent conductive line BTL.

According to an exemplary embodiment of the present disclosure, the transparent conductive line BTL, which is thinner and less ductile than the metal line UTL, is disposed under the metal line UTL. Therefore, step differences on an upper surface of the first insulating layer IL that covers the transparent conductive line BTL can be reduced. In addition, since the ductility of the metal line UTL is greater than that of the transparent conductive line BTL, a probability that the metal line UTL becomes disconnected due to the step differences of the upper surface of the first insulating layer IL can be reduced.

According to an exemplary embodiment of the present disclosure, a first width WT1 of the transparent conductive line BTL is equal to or less than a second width WT2 of the metal line UTL. Since the metal line UTL is opaque, the metal line UTL can be easily perceived or sensed as compared with the transparent conductive line BTL. Accordingly, when inspecting a short circuit between the sensing lines, the existence of a short circuit between adjacent sensing lines can be checked by using the metal line UTL.

Figure 10:
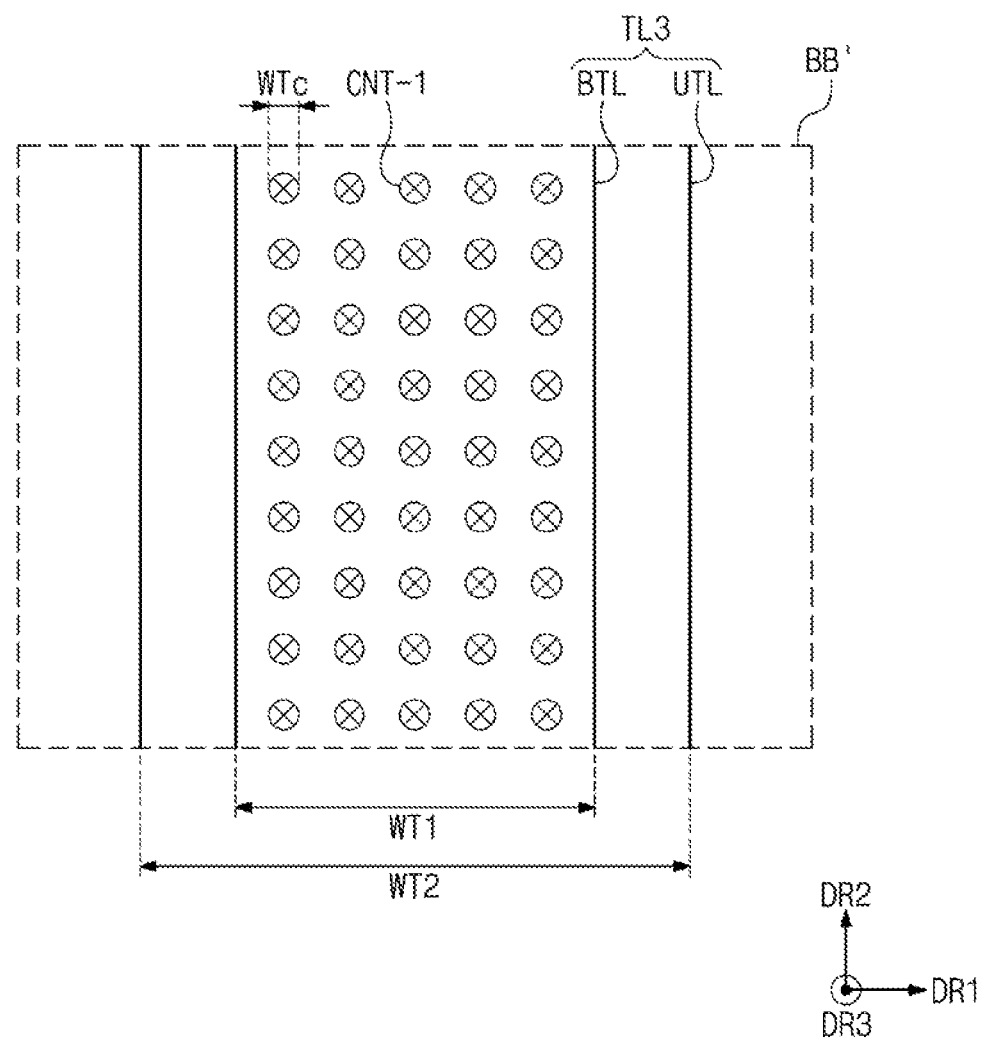
FIG. 10 is an enlarged plan view of a portion BB' in FIG. 5.

FIG. 10 is an enlarged plan view of the portion BB' in FIG. 5.

Referring to FIG. 10, according to an embodiment, each of contact holes CNT-1 has a circular shape when viewed in a plan view. In this case, a size WTc of each of the contact holes CNT-1 corresponds to a diameter of the circle. The size WTc may be equal to or greater than about 4 micrometers and equal to or less than about 100 micrometers.

Figure 11:
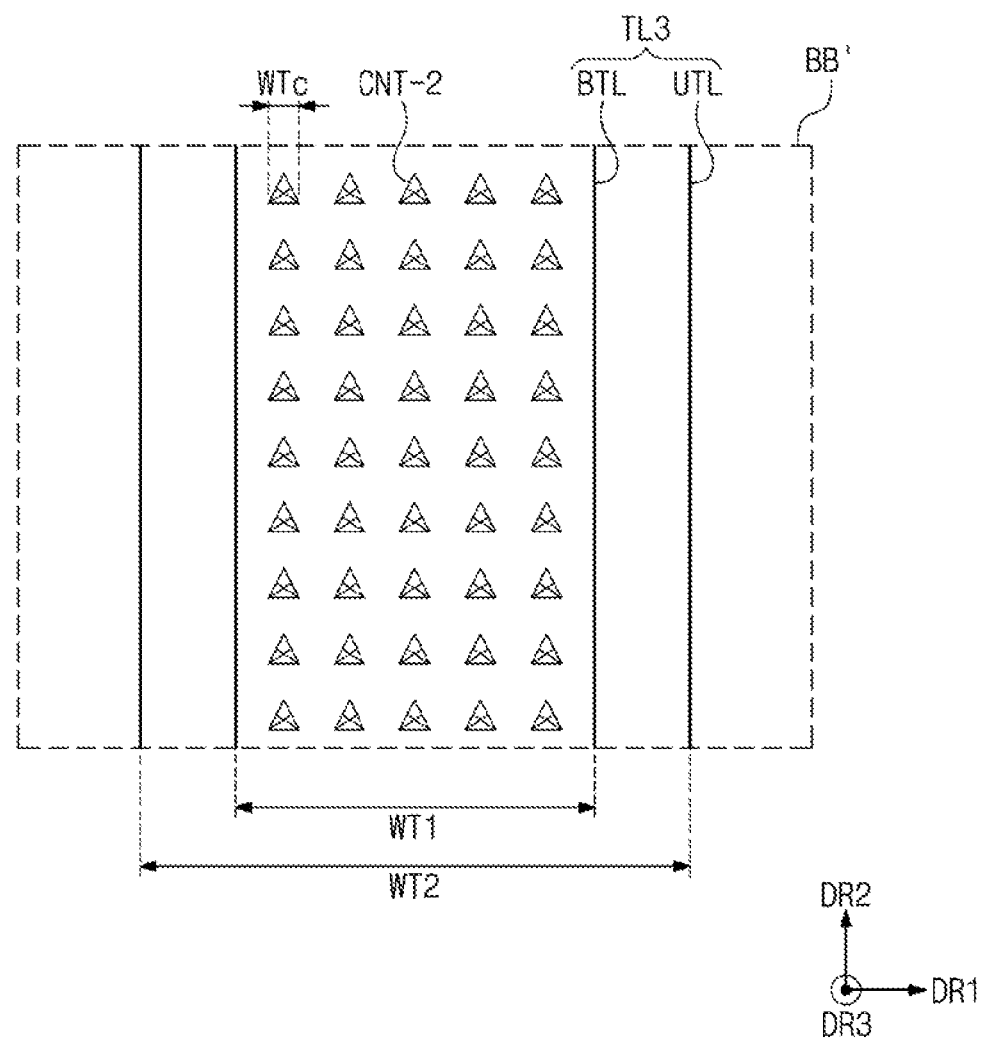
FIG. 11 is an enlarged plan view of a portion BB' in FIG. 5.

FIG. 11 is an enlarged plan view of the portion BB' in FIG. 5.

Referring to FIG. 11, each of contact holes CNT-2 has a triangular shape when viewed in a plan view. In this case, a size WTc of each of the contact holes CNT-2 corresponds to a length of one side of the triangle.

In each of FIGS. 8, 10, and 11, according to an embodiment, the contact holes that penetrate through the first insulating layer IL1, as shown in FIG. 9, have the same shape as each other, however, embodiments of the present disclosure are not limited thereto. For example, the contact holes formed through the first insulating layer IL1 can have at least two of the shapes of the contact holes CNT shown in FIGS. 8, 10, and 11.

Figure 12:
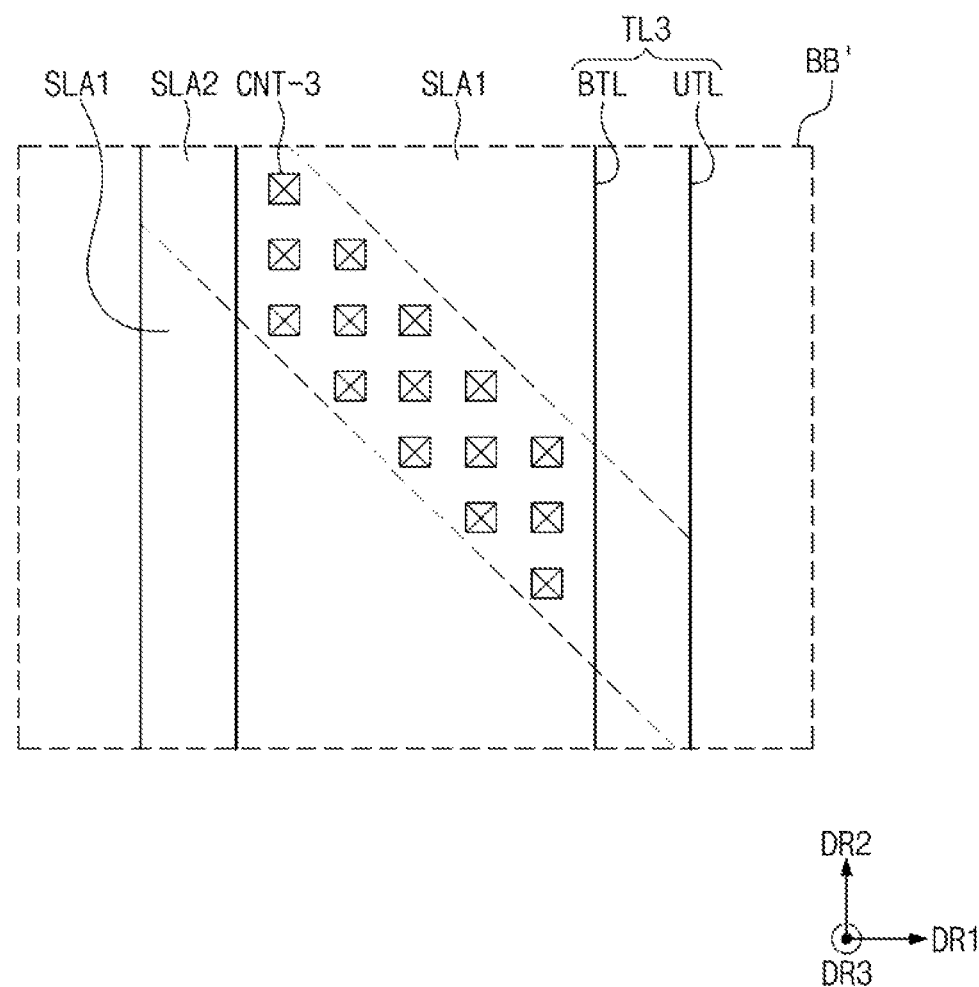
FIG. 12 is an enlarged plan view of a portion BB' in FIG. 5.

FIG. 12 is an enlarged plan view the portion BB' in FIG. 5.

Referring to FIG. 12, according to an embodiment, contact holes CNT-3 that penetrate the first insulating layer IL1 are concentrated in a specific area on the transparent conductive line BTL. For example, there is an area in which the contact holes CNT-3 are formed and an area in which the contact holes CNT-3 are not formed.

For example, according to an embodiment, the third sensing line TL3 includes a first sensing line area SLA1 and a second sensing line area SLA2. The first sensing to line area SLA1 overlaps the area is which no contact holes CNT-3 are formed, and the second sensing line area SLA2 overlaps the area in which the contact holes CNT-3 are formed.

According to an embodiment, the number of the contact holes CNT-3 per predetermined area in the area that overlaps the first sensing line area SLA1 is zero (0), and the number of the contact holes CNT-3 per predetermined area in the area that overlaps the second sensing line area SLA2 is greater than that in the first sensing line area SLA1, i.e., one (1) or greater.

According to an embodiment, FIG. 12 shows the contact holes CNT-3 formed in the area that extends diagonally across the first direction DR1 and the second direction DR2 as a representative example, however, embodiments are not limited thereto, and in other embodiments, the arrangement of the contact holes CNT-3 is not limited to that shown in FIG. 12.

Figure 13:
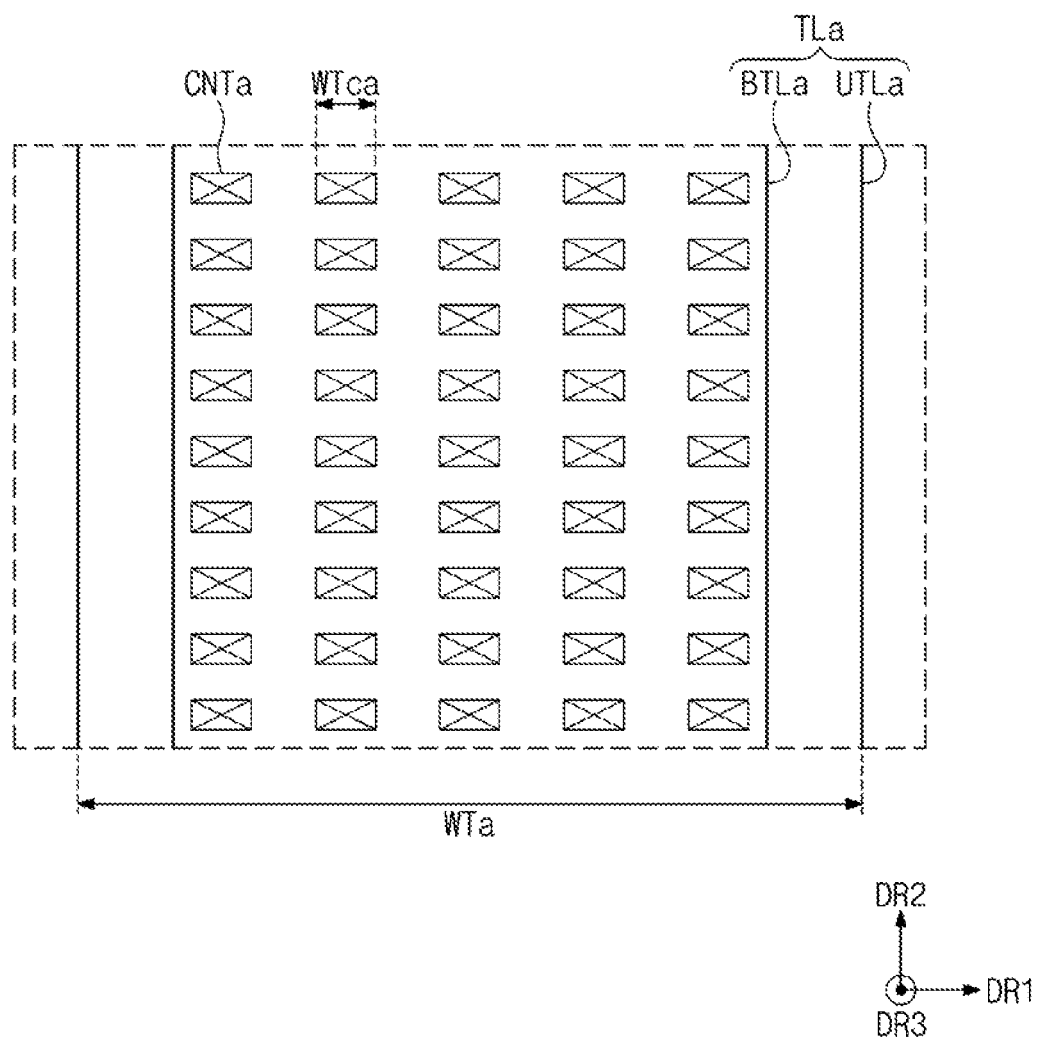
FIG. 13 is an enlarged plan view of a sensing line according to an exemplary embodiment of the present disclosure.

FIG. 13 is an enlarged plan view of a sensing line TLa according to an exemplary embodiment of the present disclosure. For example, the sensing line TLa shown in FIG. 13 is wider than the third sensing line TL3 shown in FIG. 8.

Referring to FIGS. 8 and 13, the sensing lines TL1, TL2, and TL3 shown in FIG. 5 have different widths from each other. These differently sized sensing lines are shown in FIGS. 8 and 13.

Referring to FIG. 13, according to an embodiment, the sensing line TLa includes a transparent conductive line BTLa and a metal line UTLa. The metal line UTLa is disposed on the transparent conductive line BTLa, and the metal line UTLa is to wider than the transparent conductive line BTLa.

According to an embodiment, the width WT2 of the third sensing line TL3 of FIG. 8 is less than a width WTa of the sensing line TLa of FIG. 13. The width of each of the sensing lines will be defined as the width of the relatively wider metal line.

In an exemplary embodiment of the present disclosure, the size WTc of the contact holes CNT formed in the third sensing line TL3 differs from a size WTca of contact holes CNTa formed in the sensing line TLa. For example, the width in the first direction DR1 of the contact holes CNTa differs from the width in the first direction DR1 of the contact holes CNT. The size WTca of the contact holes CNTa is greater than the size WTc of the contact holes CNT.

Figure 14:
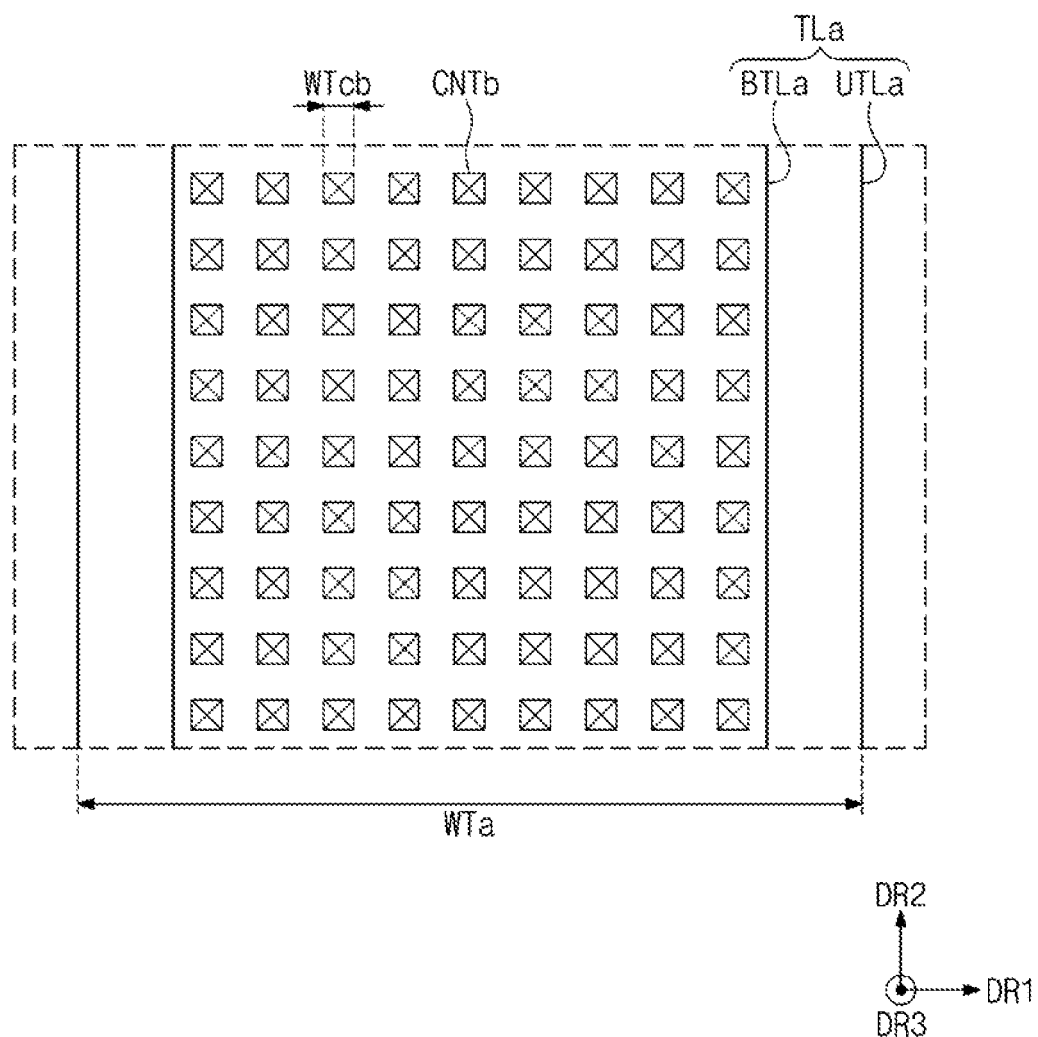
FIG. 14 is an enlarged plan view of a sensing line according to an exemplary embodiment of the present disclosure.

FIG. 14 is an enlarged plan view of a sensing line TLa according to an exemplary embodiment of the present disclosure. In FIG. 14, different features from FIG. 13 will be described.

Referring to FIGS. 8 and 14, according to an embodiment, a size WTcb of contact holes CNTb formed in the sensing line TLa is substantially the same as the size WTc of the contact holes CNT formed in the third sensing line TL3.

Figure 15:
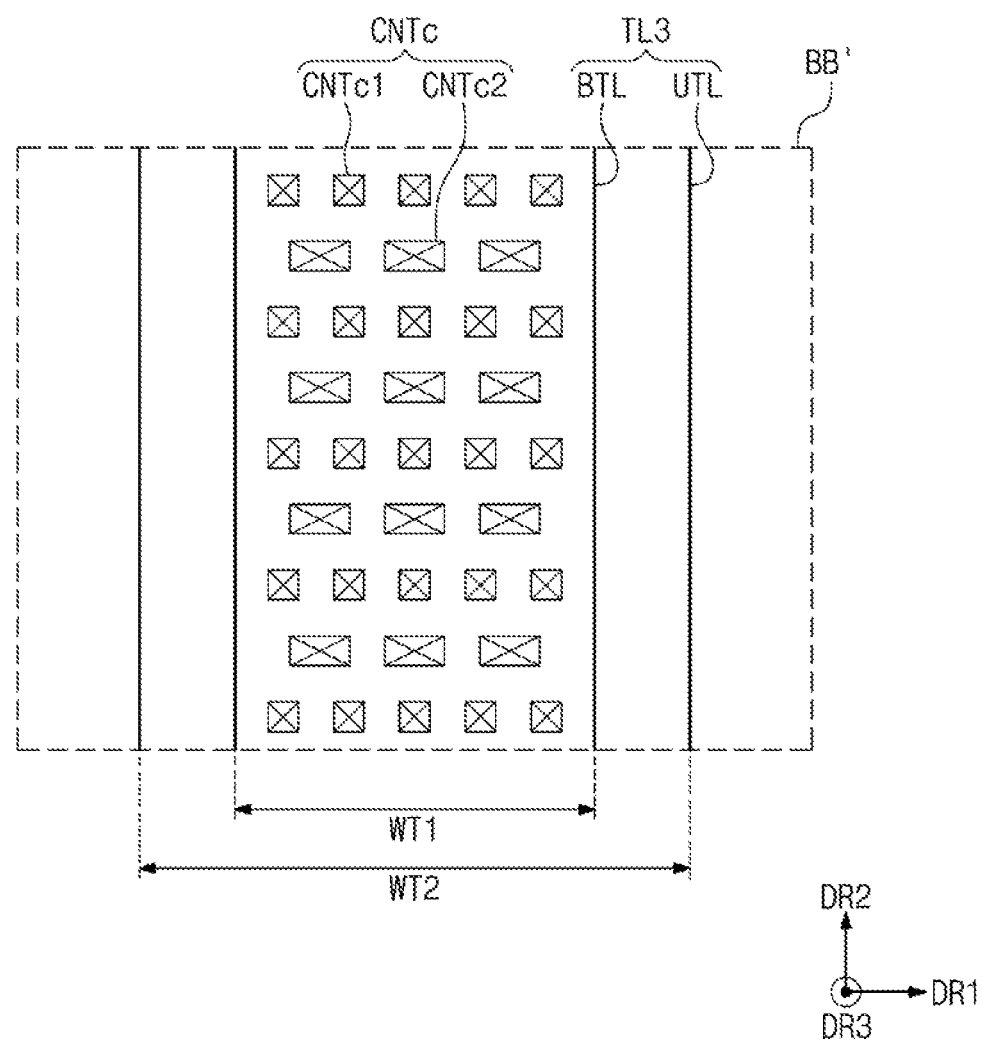
FIG. 15 is an enlarged plan view of a portion BB' in FIG. 5.

FIG. 15 is an enlarged plan view of the portion BB' shown in FIG. 5.

According to an embodiment, FIG. 15 shows contact holes CNTc formed in the first insulating layer IL1 of FIG. 9 that is disposed between the transparent conductive line BTL and the metal line UTL.

In an exemplary embodiment of the present disclosure, the contact holes CNTc have various sizes. For example, the contact holes CNTc include first contact holes CNTc1 and second contact holes CNTc2. The first contact holes CNTc have a first size, and the second contact holes CNTc2 have a second size greater than the first size.

Figure 16:
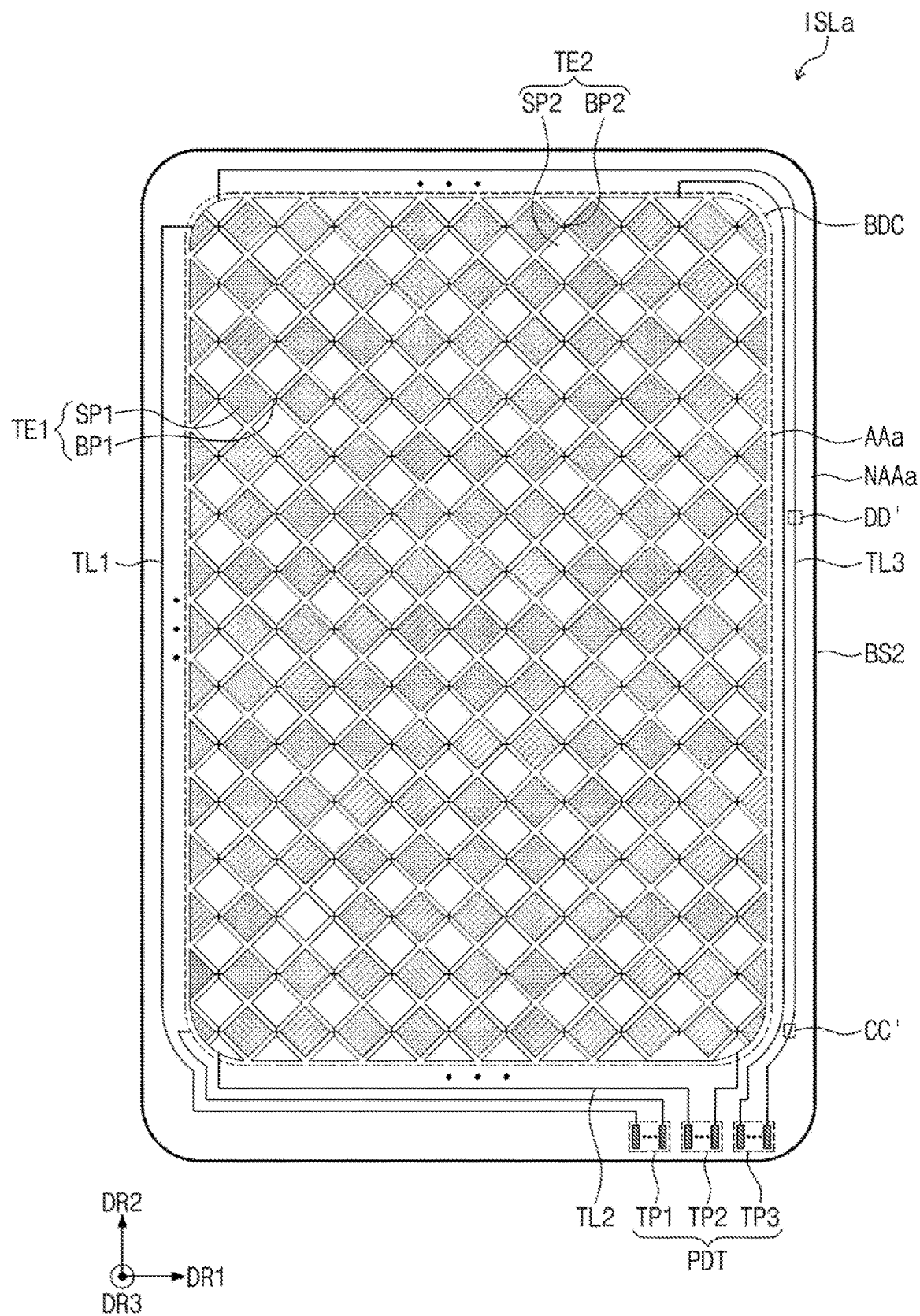
FIG. 16 is a plan view of an input sensing panel according to an exemplary embodiment of the present disclosure.

FIG. 16 is a plan view of an input sensing panel ISLa according to an exemplary embodiment of the present disclosure. In FIG. 16, different features from FIG. 5 will be described.

Referring to FIG. 16, according to an embodiment, a second substrate BS2 of the input sensing panel ISLa includes an active area AAa and a peripheral area NAAa. The peripheral area NAAa surrounds the active area AAa.

Referring to FIG. 5, since the active area AA-I has a rectangular shape, all boundaries of the active area AA-I and the peripheral area NAA-I are straight lines. However, the active area AAa shown in FIG. 16 has a shape in which a line adjacent to a vertex of the rectangular shape is curved. Accordingly, a portion of the boundary BDC between the active area AAa and the peripheral area NAAa includes a curved segment.

According to an embodiment, each of the sensing lines TL1, TL2, and TL3 includes a first segment (or referred to as a first area) that extends in a direction that crosses the widthwise direction and a second segment (or referred to as a second area) in which the extension direction of each of the sensing lines TL1, TL2, and TL3 changes. For example, in the first segment, each of the sensing lines TL1, TL2, and TL3 extends in the second direction DR2 or the first direction DR1. The second segment is adjacent to the curved boundary BDC.

Figure 17:
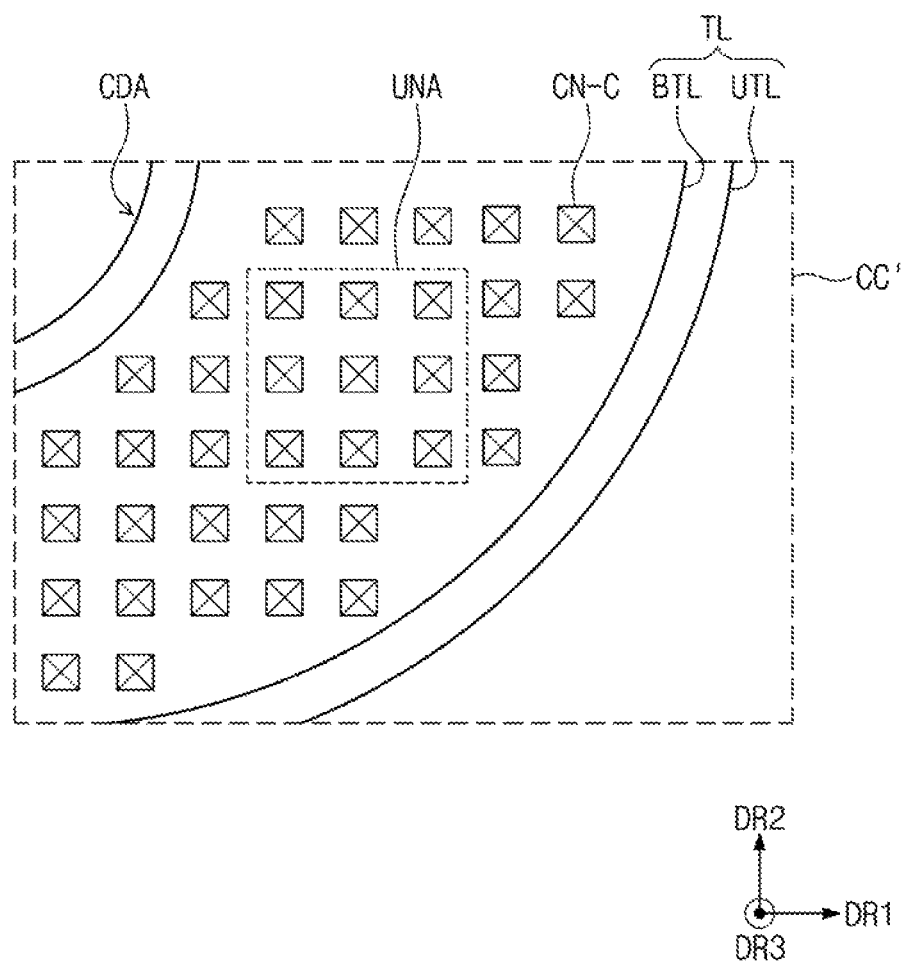
FIG. 17 is an enlarged plan view of a portion CC' in FIG. 16.
Figure 18:
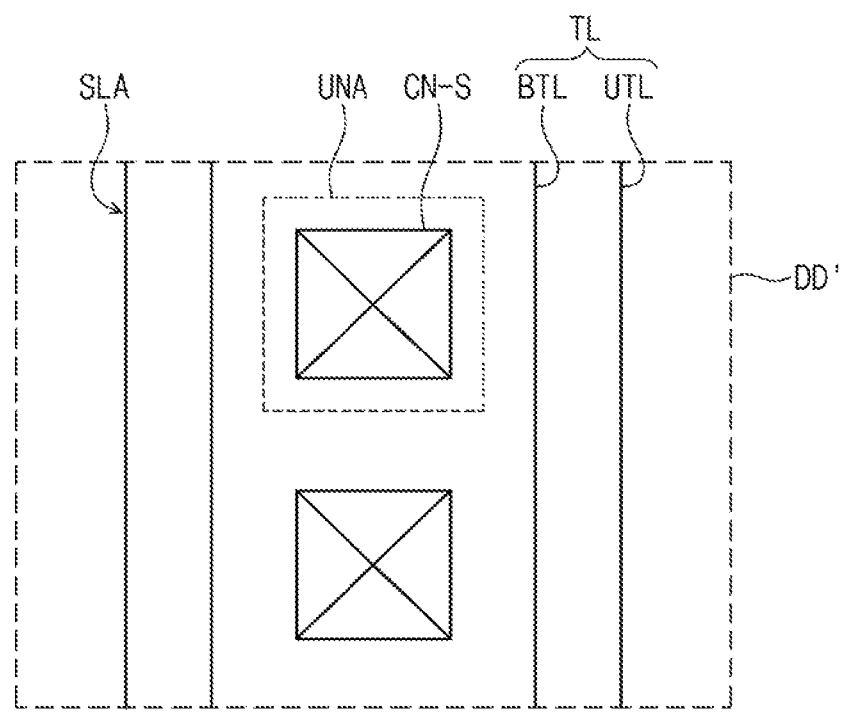
FIG. 18 is an enlarged plan view of a portion DD' in FIG. 16.

FIG. 17 is an enlarged plan view of a portion CC' in FIG. 16. FIG. 18 is an enlarged plan view of a portion DD' in FIG. 16. For instance, FIG. 17 shows an enlarged second segment CDA of the sensing line TL, and FIG. 18 shows an enlarged first segment SLA of the sensing line TL.

Referring to FIGS. 16, 17, and 18, according to an embodiment, a size of contact holes CN-S formed in an area that overlaps the first area SLA is greater than a size of contact holes CN-C formed in an area that overlaps the second area CDA. Therefore, the number of the contact holes CN-C per predetermined area UNA is greater than the number of the contact holes CN-S per predetermined area UNA.

Figure 19:
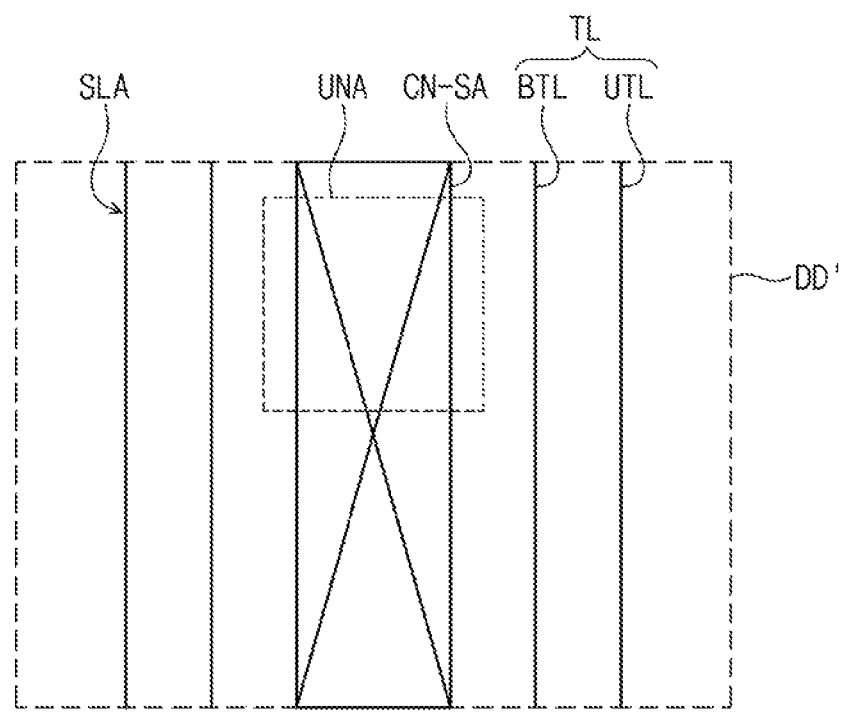
FIG. 19 is an enlarged plan view of a portion DD' in FIG. 16.

FIG. 19 is an enlarged plan view of a portion DD' in FIG. 16.

Referring to FIG. 19, according to an embodiment, a contact hole CN-SA formed in an area that overlaps the first area SLA extends in the extension direction of the sensing line TL, i.e., along the second direction DR2. A length of the contact hole CN-SA in the second direction DR2 is greater than a width of the contact hole CN-SA in the first direction DR1. A size of the contact hole CN-SA is greater than a size of the predetermined area UNA. One contact hole CN-SA of the first area SLA is disposed in the widthwise direction of the sensing line TL, i.e., the first direction DR1. The contact hole CN-SA may be referred to as a "line contact hole".

Although exemplary embodiments of the present disclosure have been described, it is understood that embodiments of the present disclosure should not be limited to these exemplary embodiments but various changes and modifications can be made by one ordinary skilled in the art within the spirit and scope of embodiments of the present disclosure as hereinafter claimed. Therefore, the disclosed subject matter should not be limited to exemplary embodiments described herein, and the scope of embodiments of the present inventive concept shall be determined according to the attached claims.

What is claimed is:

1. A display device, comprising:
    a display panel; and
    an input sensing panel which includes a sensing electrode disposed on the display panel and which senses an input, a sensing line electrically connected to the sensing electrode and which includes a transparent conductive line disposed on the display panel and a metal line disposed on the transparent conductive line, an insulating layer disposed between the transparent conductive line and the metal line, and a plurality of contact holes which penetrate through the insulating layer and expose the transparent conductive line, wherein the metal line is electrically connected to the transparent conductive line through the plurality of contact holes, some of the plurality of contact holes are arranged in a widthwise direction of the transparent conductive line, and the plurality of contact holes overlap each of the transparent conductive line and the metal line, and the transparent conductive line completely overlaps the metal line when viewed in a plan view.

2. The display device of claim 1, wherein the transparent conductive line has a first thickness which is less than a second thickness of the metal line.

3. The display device of claim 1, wherein the transparent conductive line has a first width equal to or less than a second width of the metal line.

4. The display device of claim 1, wherein each of the plurality of contact holes has a size equal to or greater than about 4 micrometers and equal to or less than about 40 micrometers.

5. The display device of claim 1, wherein each of the plurality of contact holes has a circular shape or a polygonal shape when viewed in a plan view.

6. The display device of claim 1, wherein the plurality of contact holes are arranged in a first direction and a second direction which crosses the first direction.

7. The display device of claim 1, wherein the plurality of contact holes comprise first contact holes each having a first size and second contact holes each having a second size different from the first size.

8. The display device of claim 1, wherein
the sensing line is one of a plurality of sensing lines,
the plurality of sensing lines comprise first sensing lines each having a first width and second sensing lines each having a second width different from the first width, and
a size of each of the plurality of contact holes of the first sensing lines differs from a size of each of the plurality of contact holes of the second sensing lines.

9. The display device of claim 1, wherein
the sensing line is one of a plurality of sensing lines,
the plurality of sensing lines comprise first sensing lines each having a first width and second sensing lines each having a second width different from the first width, and
a size of each of the plurality of contact holes of the first sensing lines is equal to a size of each of the plurality of contact holes of the second sensing lines.

10. The display device of claim 1, wherein
the sensing line comprises a first sensing line area and a second sensing line area, and
a number of contact holes per predetermined area in the first sensing line area differs from a number of contact holes per predetermined area in the second sensing line area.

11. The display device of claim 1, wherein the sensing line comprises
a first area which extends in a predetermined direction which crosses the widthwise direction and
a second area in which an extension direction of the sensing line changes, and
a number of contact holes per predetermined area in the first area differs from a number of contact holes per predetermined area in the second area.

12. The display device of claim 11, wherein a size of each of the plurality of contact holes disposed in the first area is greater than a size of each of the plurality of contact holes disposed in the second area.

13. The display device of claim 12, wherein the number of contact holes per predetermined area in the first area is less than the number of contact holes per predetermined area in the second area.

14. The display device of claim 1, wherein the transparent conductive line includes indium tin oxide, and the metal line includes molybdenum.

15. An input sensing panel, comprising:
a base layer;
a sensing electrode disposed on the base layer and which senses an input;
a transparent conductive line electrically connected to the sensing electrode;
an insulating layer disposed on the transparent conductive line;
a plurality of contact holes formed in the insulating layer which penetrate therethrough and expose the transparent conductive line; and
a metal line disposed on the insulating layer and electrically connected to the transparent conductive line through the plurality of contact holes,
wherein some of the plurality of contact holes are arranged in a widthwise direction of the transparent conductive line when viewed in a plan view,
the plurality of contact holes overlap each of the transparent conductive line and the metal line, and
the transparent conductive line completely overlaps the metal line when viewed in a plan view.

16. The input sensing panel of claim 15, wherein
the transparent conductive line has a first width equal to or less than a second width of the metal line, and
the transparent conductive line has a first thickness less than a second thickness of the metal line.

17. The input sensing panel of claim 15, wherein each of the plurality of contact holes has a size equal to or greater than about 4 micrometers and equal to or less than about 40 micrometers.

18. The input sensing panel of claim 15, wherein the transparent conductive line includes indium tin oxide, and the metal line includes molybdenum.

19. A display device, comprising:
a display panel; and
an input sensing panel which includes
a sensing electrode disposed on the display panel, wherein the sensing electrode senses an input,
a sensing line electrically connected to the sensing electrode and which includes a transparent conductive line disposed on the display panel and a metal line disposed on the transparent conductive line,
an insulating layer disposed between the transparent conductive line and the metal line, and
a plurality of contact holes which penetrate through the insulating layer and expose the transparent conductive line, wherein the transparent conductive line has a first thickness which is less than a second thickness of the metal line, and a first width equal to or less than a second width of the metal line, the metal line is electrically connected to the transparent conductive line through the plurality of contact holes, the plurality of contact holes overlap each of the transparent conductive line and the metal line, and the transparent conductive line completely overlaps the metal line when viewed in a plan view.

20. The display device of claim 19, wherein some of the plurality of contact holes are arranged in a widthwise direction of the transparent conductive line.

* * * * *